(12) United States Patent
Mo et al.

(10) Patent No.: US 11,088,748 B2
(45) Date of Patent: Aug. 10, 2021

(54) MULTI-BAND BEAM CODEBOOK DESIGN AND OPERATIONS

(71) Applicant: Samsung Electronics Co., Ltd., Suwon-si (KR)

(72) Inventors: Jianhua Mo, Allen, TX (US); Boon Loong Ng, Plano, TX (US); Md. Saifur Rahman, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/003,718

(22) Filed: Aug. 26, 2020

(65) Prior Publication Data

US 2021/0067225 A1 Mar. 4, 2021

Related U.S. Application Data

(60) Provisional application No. 62/894,078, filed on Aug. 30, 2019.

(51) Int. Cl.
*H04W 72/04* (2009.01)
*H04B 7/06* (2006.01)
*H04L 5/00* (2006.01)

(52) U.S. Cl.
CPC ......... *H04B 7/0639* (2013.01); *H04B 7/0626* (2013.01); *H04L 5/0023* (2013.01);
(Continued)

(58) Field of Classification Search
CPC ............... H04W 72/042; H04W 24/10; H04W 72/0446; H04W 24/08; H04W 56/001;
(Continued)

(56) References Cited

U.S. PATENT DOCUMENTS 10,735,066 B2 8/2020 Mo et al.
2013/0278463 A1* 10/2013 Nilsson ................. H01Q 1/246
342/417

(Continued)

FOREIGN PATENT DOCUMENTS

WO 2018031082 A1 2/2018

OTHER PUBLICATIONS

Mo, et al., "Beam Codebook Design for 5G mmWave Terminals", IEEEAccess, vol. 7, Aug. 7, 2019, 18 pages.
(Continued)

*Primary Examiner* — Eva Y Puente

(57) ABSTRACT

An electronic device and method for managing an antenna operating in a combination of frequency bands. The electronic device comprises at least one antenna including a plurality of antenna elements, a transceiver operably connected with the at least one antenna and configured for communication over multiple frequency parts. The electronic device also comprises a processor operably connected to the transceiver, the processor configured to determine the multiple frequency parts; identify, from a configuration received in response to the multiple frequency parts reported in the PUCCH, a combination of one or more frequency parts from the multiple frequency parts for performing the communication; obtain a beamforming codebook; and apply one or more beams within the beamforming codebook for performing the communication.

20 Claims, 15 Drawing Sheets

(52) U.S. Cl.
CPC .......... *H04L 5/0048* (2013.01); *H04L 5/0057* (2013.01); *H04W 72/042* (2013.01)

(58) Field of Classification Search
CPC ........... H04W 72/0413; H04W 72/046; H04W 72/14; H04W 72/0453; H04W 74/0833; H04W 16/14; H04W 4/029; H04L 5/0048; H04L 5/0051; H04L 5/0053; H04L 5/0023; H04L 5/001; H04L 5/0055; H04L 5/0007; H04L 1/08; H04L 5/005; H04L 5/0094; H04L 1/0061; H04L 1/0071; H04L 1/1812; H04B 7/0617; H04B 7/0626; H04B 7/0695; H04B 7/088; H04B 17/318; H04B 17/336; H04B 7/0413; H04B 7/0404; H04B 7/0469; H04B 7/0639; H04B 17/309; H04B 1/0483; H04B 7/06
USPC ........................................................ 375/267
See application file for complete search history.

(56) References Cited

U.S. PATENT DOCUMENTS

| | | |
|---|---|---|
| 2019/0081667 A1 | 3/2019 | Yang et al. |
| 2019/0173537 A1 | 6/2019 | Cai et al. |
| 2019/0253122 A1* | 8/2019 | Yang ....................... H04L 27/00 |
| 2021/0091462 A1* | 3/2021 | Kovacic ................... H01Q 3/36 |

OTHER PUBLICATIONS

LG Electronics, "Discussion on multi-beam based operations and enhancements," R1-1908700, 3GPP TSG RAN WG1 Meeting #98, Prague, CZ, Aug. 26-30, 2019, 13 pages.

International Search Report of the International Searching Authority dated Nov. 27, 2020 in connection with International Application No. PCT/KR2020/011650, 3 pages.

* cited by examiner

MULTI-BAND BEAM CODEBOOK DESIGN AND OPERATIONS

CROSS-REFERENCE TO RELATED APPLICATION AND CLAIM OF PRIORITY

This application claims priority under 35 U.S.C. § 119(e) to U.S. Provisional Patent Application No. 62/894,078 filed on Aug. 30, 2019. The above-identified provisional patent application is hereby incorporated by reference in its entirety.

TECHNICAL FIELD

The present disclosure relates to a pre-$5^{th}$-Generation (5G) or 5G communication system to be provided for supporting higher data rates Beyond $4^{th}$-Generation (4G) communication system such as Long-Term Evolution (LTE). More particularly, the present disclosure is directed to management of an antenna operating in a combination of two or more frequency bands.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

A communication system includes a DownLink (DL) that conveys signals from transmission points such as Base Stations (BSs) or eNodeBs to User Equipments (UEs) and an UpLink (UL) that conveys signals from UEs to reception points such as eNodeBs. A UE, also commonly referred to as a terminal or a mobile station, may be fixed or mobile and may be a cellular phone, a personal computer device, etc. An eNodeB, which is generally a fixed station, may also be referred to as an access point or other equivalent terminology.

A 5G terminal or UE can be equipped with multiple antenna elements. There can also be one or more antenna modules fitted on the terminal where each module can have one or more antenna elements. Beamforming is used when UE tries to establish a connection with a BS station. To compensate for the narrower analog beamwidth in mmWave, analog beams sweeping can be employed to enable wider signal reception or transmission coverage for the UE. A beam codebook comprises a set of codewords, where a codeword is a set of analog phase shift values, or a set of amplitude plus phase shift values, applied to the antenna elements, in order to form an analog beam. 5G can operate on one or more mmWave bands.

SUMMARY

Embodiments of the present disclosure include an electronic device and a method for managing an antenna operating in a combination of frequency bands.

One embodiment is directed to a UE that includes at least one antenna including a plurality of antenna elements, a transceiver operably connected with the at least one antenna, the transceiver configured for communication over multiple frequency parts, and a processor operably connected to the transceiver. The processor is configured to determine the multiple frequency parts based on at least one of: spacing between the plurality of antenna elements, wavelengths of the multiple frequency parts, a radiation gain of the transceiver, or radiation efficiency of the multiple frequency parts. The processor is also configured to report, in a physical uplink control channel (PUCCH), the multiple frequency parts for performing the communication; identify, from a configuration received in response to the multiple frequency parts reported in the PUCCH, a combination of one or more frequency parts from the multiple frequency parts for performing the communication; and obtain a beamforming codebook by (i) selecting the beamforming codebook from a plurality of beamforming codebooks stored in memory, the selected beamforming codebook based on the combination of the one or more frequency parts and a bandwidth management operation, or (ii) generating the beamforming codebook based on the combination of the one or more frequency parts and the bandwidth management operation. The processor is also configured to apply one or more beams within the beamforming codebook for performing the communication.

Another embodiment is directed to a method for managing an antenna operating in a combination of frequency bands. The method includes determining, for an antenna including a plurality of antenna elements configured for communication over multiple frequency parts, the multiple frequency parts based on at least one of: spacing between the plurality of antenna elements, wavelengths of the multiple frequency parts, a radiation gain of the transceiver, or radiation efficiency of the multiple frequency parts; reporting, in a physical uplink control channel (PUCCH), the multiple frequency parts for performing the communication; identifying, from a configuration received in response to the multiple frequency parts reported in the PUCCH, a combination of one or more frequency parts from the multiple frequency parts for performing the communication; obtaining a beamforming codebook by (i) selecting the beamforming codebook from a plurality of beamforming codebooks stored in memory, the selected beamforming codebook based on the combination of the one or more frequency parts and a bandwidth management operation, or (ii) generating the beamforming codebook based on the combination of the one or more frequency parts and the bandwidth management operation; and applying one or more beams within the beamforming codebook for performing the communication.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C; A and B; A and C; B and C; A; B; and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

The figures included herein, and the various embodiments used to describe the principles of the present disclosure are by way of illustration only and should not be construed in any way to limit the scope of the disclosure. Further, those skilled in the art will understand that the principles of the present disclosure may be implemented in any suitably arranged wireless communication system.

The 5G network operates on one or more frequency parts. As used herein, a frequency part can be a frequency band, a carrier within a band, or a bandwidth part (BWP) within a carrier. A frequency band combination is one or more frequency parts. For example, FCC's 5G FAST Plan allows 5G deployment in multiple frequency parts, including, for example, 24 GHz, 28 GHz and 39 GHz. Due to the form factor constraints, the UE device may not be able to have dedicated antenna array for each band. For the base station, an antenna array can be mounted at the base station to compensate the high path loss at the mmWave bands. To save on cost, the operator may deploy a common antenna array to support multiple mmWave frequency parts instead of deploying multiple antenna arrays, each dedicated to a frequency part.

If the antenna spacing of the antenna array is equal to half wavelength at one frequency band, it will be more than or less than half wavelength at another frequency band. As a result, a codebook designed for one frequency band may not work well in other frequency parts. Accordingly, novel aspects of this disclosure recognize the need for implementing multi-band beamforming codebooks that can be applied to an antenna array operating over a combination of two or more frequency parts. While the embodiments disclosed herein relate to mmWave parts, the embodiments in this disclosure can also be applied to other frequency parts as well.

Figure 1:
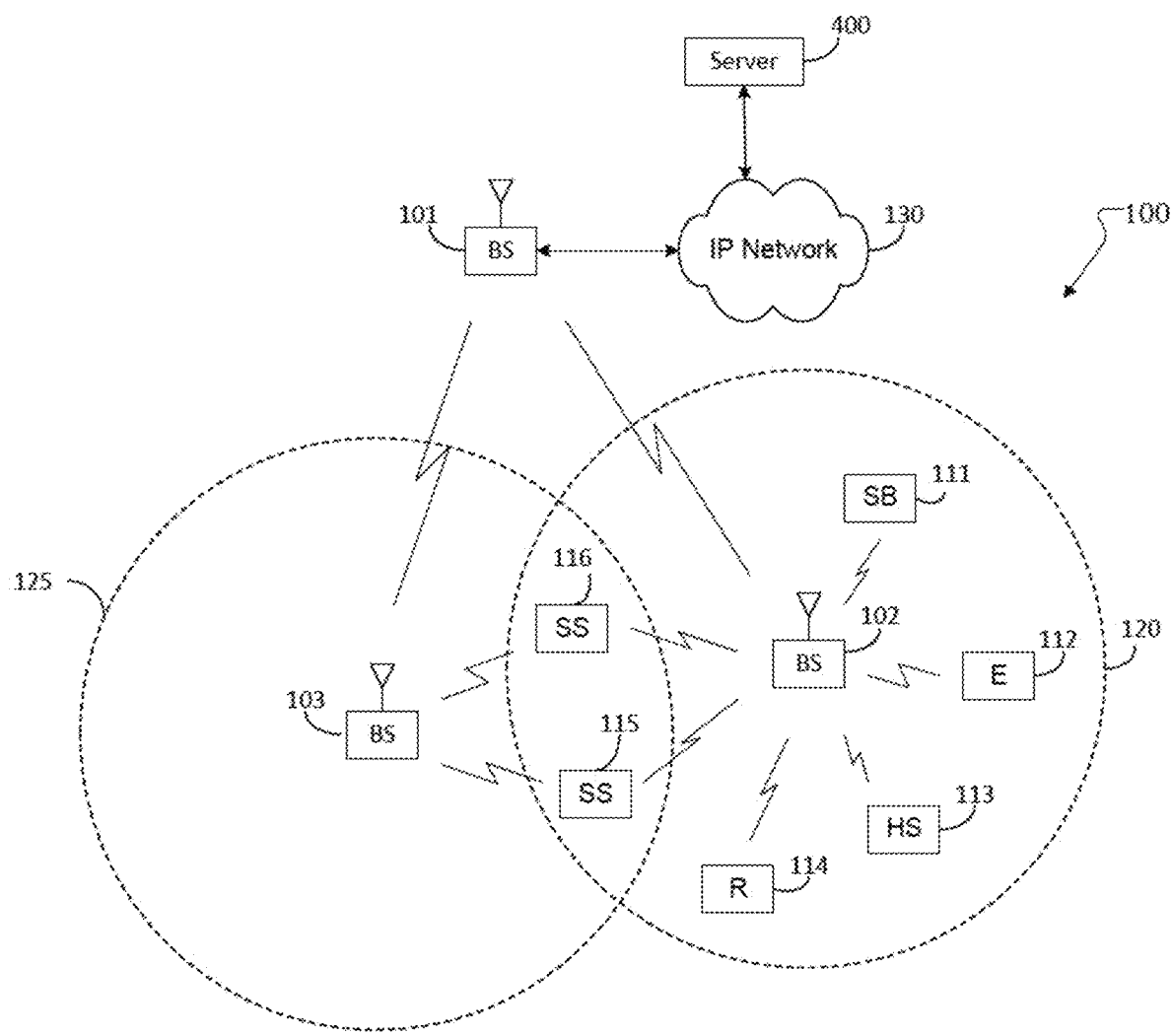
FIG. 1 illustrates an exemplary networked computing system according to various embodiments of this disclosure.

FIG. 1 illustrates an exemplary networked computing system according to various embodiments of this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an gNodeB (gNB) 101, an gNB 102, and an gNB 103. The gNB 101 communicates with the gNB 102 and the gNB 103. The gNB 101 also communicates with at least one Internet Protocol (IP) network 130, such as the Internet, a proprietary IP network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB or gNB), a macrocell, a femtocell, a WiFi access point (AP), or other wirelessly enabled devices. Base stations may provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, wireless network 100 can be a 5G communication system in which an electronic device, such as UE 116 or BS 102, can manage an antenna operating in a combination of frequency parts.

Although FIG. 1 illustrates one example of a wireless network 100, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNB 101, 102, and/or 103 could provide access to other or additional external networks, such as external telephone networks or other types of data networks.

Figure 2:
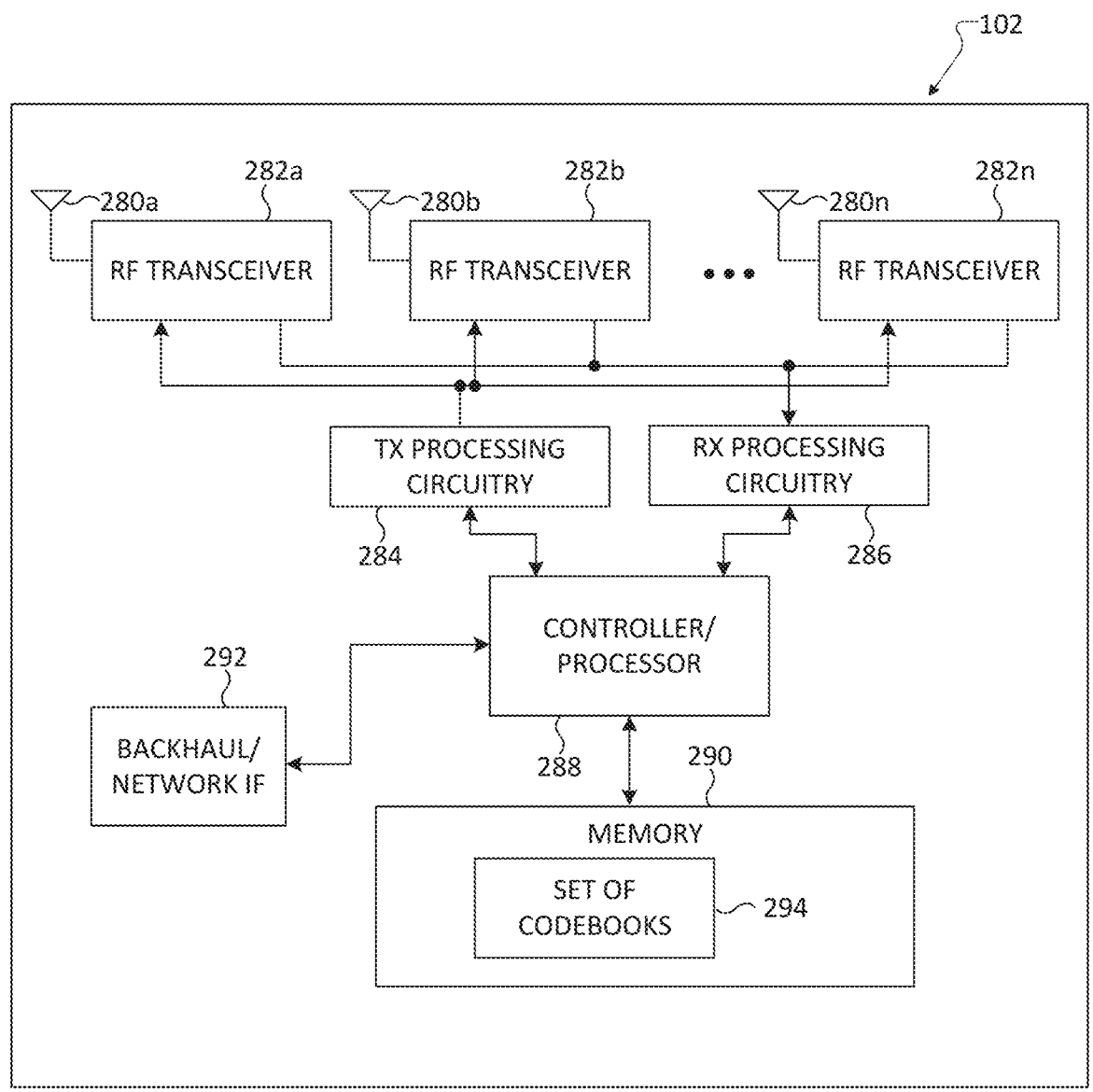
FIG. 2 illustrates an exemplary base station (BS) in the networked computing system according to various embodiments of this disclosure.

FIG. 2 illustrates an exemplary base station (BS) according to various embodiments of this disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of an gNB.

As shown in FIG. 2, the gNB 102 includes multiple antennas 280a-280n, multiple RF transceivers 282a-282n, transmit (TX) processing circuitry 284, and receive (RX) processing circuitry 286. The gNB 102 also includes a controller/processor 288, a memory 290, and a backhaul or network interface 292.

The RF transceivers 282a-282n receive, from the antennas 280a-280n, incoming RF signals, such as signals transmitted by UEs in the network 100. The RF transceivers 282a-282n down-convert the incoming RF signals to generate IF or baseband signals. The IF or baseband signals are sent to the RX processing circuitry 286, which generates processed baseband signals by filtering, decoding, and/or digitizing the baseband or IF signals. The RX processing circuitry 286 transmits the processed baseband signals to the controller/processor 288 for further processing.

The TX processing circuitry 284 receives analog or digital data (such as voice data, web data, e-mail, or interactive video game data) from the controller/processor 288. The TX processing circuitry 284 encodes, multiplexes, and/or digitizes the outgoing baseband data to generate processed baseband or IF signals. The RF transceivers 282a-282n receive the outgoing processed baseband or IF signals from the TX processing circuitry 284 and up-converts the baseband or IF signals to RF signals that are transmitted via the antennas 280a-280n.

The controller/processor 288 can include one or more processors or other processing devices that control the overall operation of the gNB 102. For example, the controller/processor 288 could control the reception of forward channel signals and the transmission of reverse channel signals by the RF transceivers 282a-282n, the RX processing circuitry 286, and the TX processing circuitry 284 in accordance with well-known principles. The controller/processor 288 could support additional functions as well, such as more advanced wireless communication functions. For instance, the controller/processor 288 could support beam forming or directional routing operations in which outgoing signals from multiple antennas 280a-280n are weighted differently to effectively steer the outgoing signals in a desired direction. Any of a wide variety of other functions could be supported in the gNB 102 by the controller/processor 288. In some embodiments, the controller/processor 288 includes at least one microprocessor or microcontroller.

The controller/processor 288 is also capable of executing programs and other processes resident in the memory 290, such as a basic OS. The controller/processor 288 can move data into or out of the memory 290 as required by an executing process.

The controller/processor 288 is also coupled to the backhaul or network interface 292. The backhaul or network interface 292 allows the gNB 102 to communicate with other devices or systems over a backhaul connection or over a network. The interface 292 could support communications over any suitable wired or wireless connection(s). For example, when the gNB 102 is implemented as part of a cellular communication system (such as one supporting 5G, LTE, or LTE-A), the interface 292 could allow the gNB 102 to communicate with other gNBs over a wired or wireless backhaul connection. When the gNB 102 is implemented as an access point, the interface 292 could allow the gNB 102 to communicate over a wired or wireless local area network or over a wired or wireless connection to a larger network (such as the Internet). The interface 292 includes any suitable structure supporting communications over a wired or wireless connection, such as an Ethernet or RF transceiver.

The memory 290 is coupled to the controller/processor 288. Part of the memory 290 could include a RAM, and another part of the memory 290 could include a Flash memory or other ROM.

As described in more detail below, in some embodiments, management of an antenna operating in a combination of frequency parts can be performed in an electronic device, such as BS 102. Additionally, the antenna can be managed based on a set of codebooks 294 stored in memory 290.

Although FIG. 2 illustrates one example of gNB 102, various changes may be made to FIG. 2. For example, the gNB 102 could include any number of each component shown in FIG. 2. As a particular example, an access point could include a number of interfaces 292, and the controller/processor 288 could support routing functions to route data between different network addresses. As another particular example, while shown as including a single instance of TX processing circuitry 284 and a single instance of RX processing circuitry 286, the gNB 102 could include multiple instances of each (such as one per RF transceiver). Also, various components in FIG. 2 could be combined, further subdivided, or omitted and additional components could be added according to particular needs.

Figure 3:
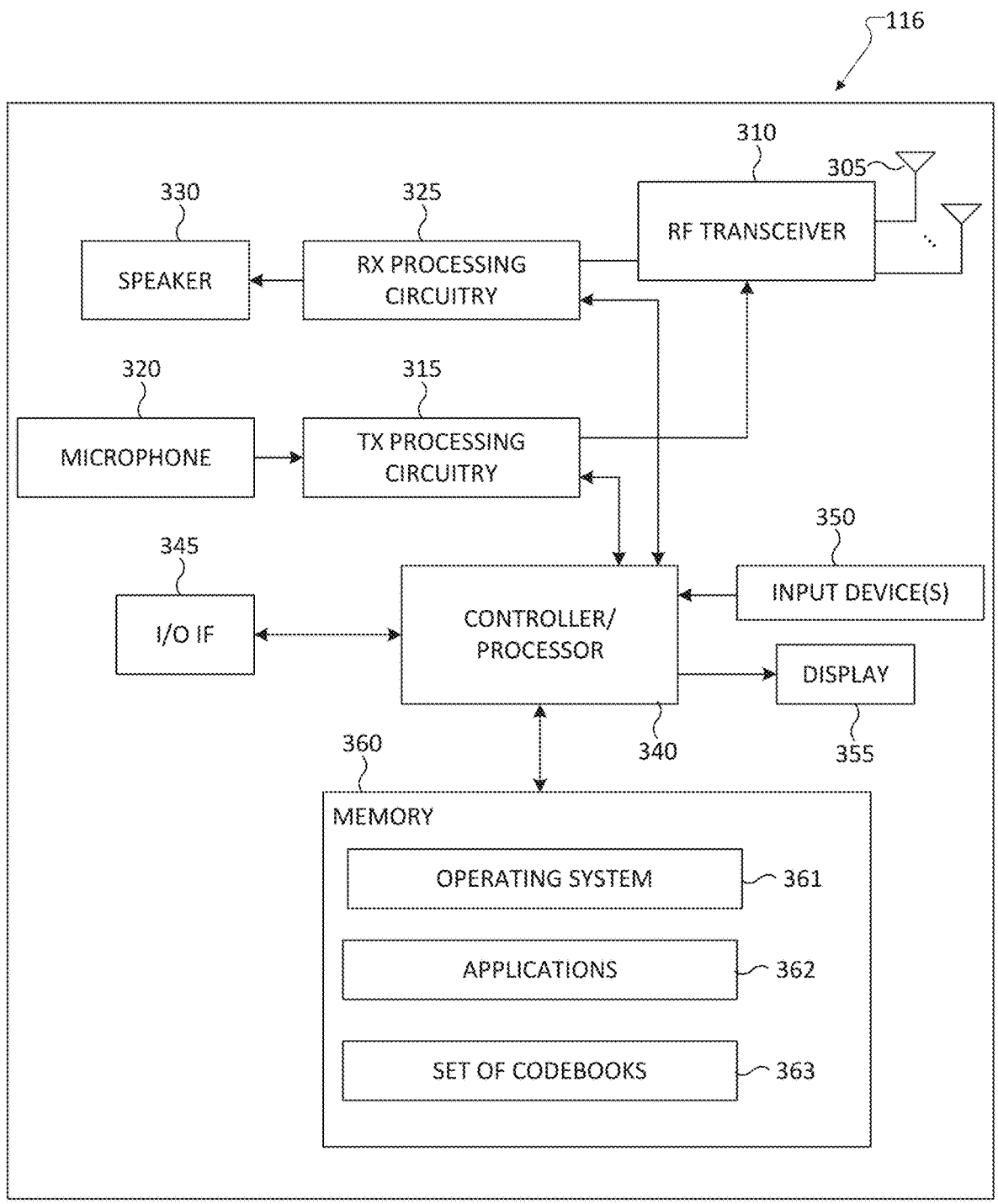
FIG. 3 illustrates an exemplary user equipment (UE) in the networked computing system according to various embodiments of this disclosure.

FIG. 3 illustrates an exemplary user equipment (UE) according to various embodiments of this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360. The main processor 340 can move data into or out of the memory 360 as required by an executing process. In some embodiments, the main processor 340 is configured to execute the applications 362 based on the OS program 361 or in response to signals received from gNBs or an operator. The main processor 340 is also coupled to the I/O interface 345, which provides the UE 116 with the ability to connect to other devices such as laptop computers and handheld computers. The I/O interface 345 is the communication path between these accessories and the main processor 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random-access memory (RAM), and another part of the memory 360 could include a Flash memory or other read-only memory (ROM).

As described in more detail below, management of an antenna operating in a combination of frequency parts can be performed in an electronic device, such as UE 116. Additionally, the antenna can be managed based on a set of codebooks 363 stored in memory 360.

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
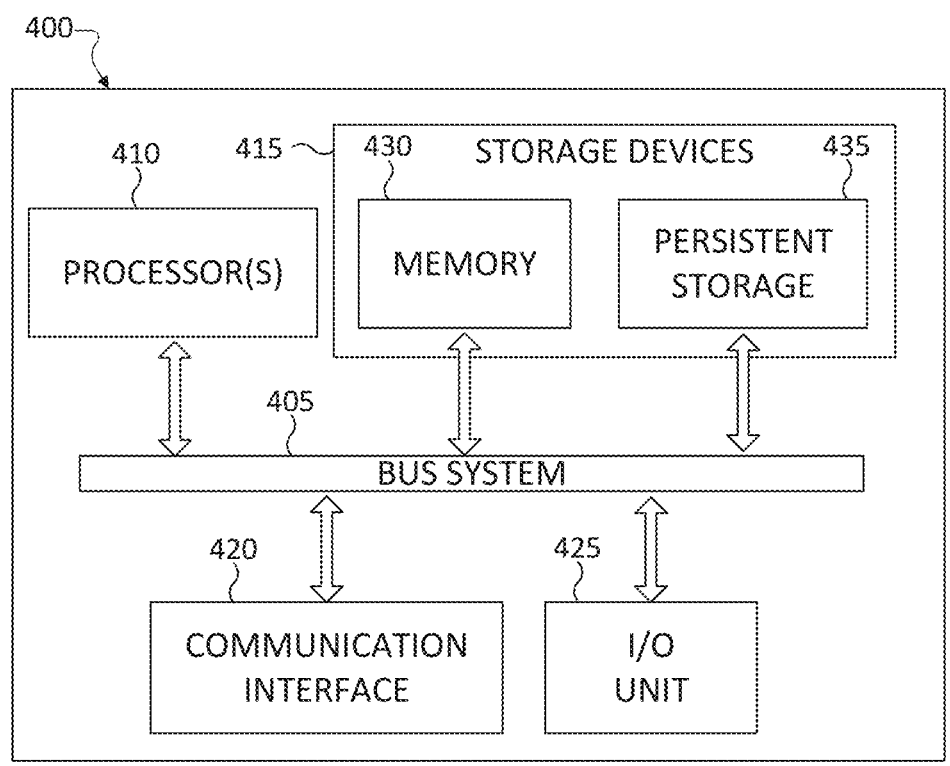
FIG. 4 illustrates an exemplary server in the networked computing system according to various embodiments of this disclosure.

FIG. 4 illustrates an exemplary server according to various embodiments of this disclosure. The server 400 includes a bus system 405, which supports communication between at least one processing device 410, at least one storage device 415, at least one communications unit 420, and at least one input/output (I/O) unit 425.

The processing device 410 executes instructions that may be loaded into a memory 430. The processing device 410 may include any suitable number(s) and type(s) of processors or other devices in any suitable arrangement. Example types of processing devices 410 include microprocessors, microcontrollers, digital signal processors, field programmable gate arrays, application specific integrated circuits, and discreet circuitry.

The memory 430 and a persistent storage 435 are examples of storage devices 415, which represent any structure(s) capable of storing and facilitating retrieval of information (such as data, program code, and/or other suitable information on a temporary or permanent basis). The memory 430 may represent a random access memory or any other suitable volatile or non-volatile storage device(s). The persistent storage 435 may contain one or more components or devices supporting longer-term storage of data, such as a ready only memory, hard drive, Flash memory, or optical disc.

The communications unit 420 supports communications with other systems or devices. For example, the communications unit 420 could include a network interface card or a wireless transceiver facilitating communications over the network 130 in FIG. 1. The communications unit 420 may support communications through any suitable physical or wireless communication link(s).

The I/O unit 425 allows for input and output of data. For example, the I/O unit 425 may provide a connection for user input through a keyboard, mouse, keypad, touchscreen, or other suitable input device. The I/O unit 425 may also send output to a display, printer, or other suitable output device.

As described in more detail below, an antenna operating in a combination of frequency parts can be managed based on one or more codebooks generated in a server, such as server 400 in FIG. 4.

Figure 5:
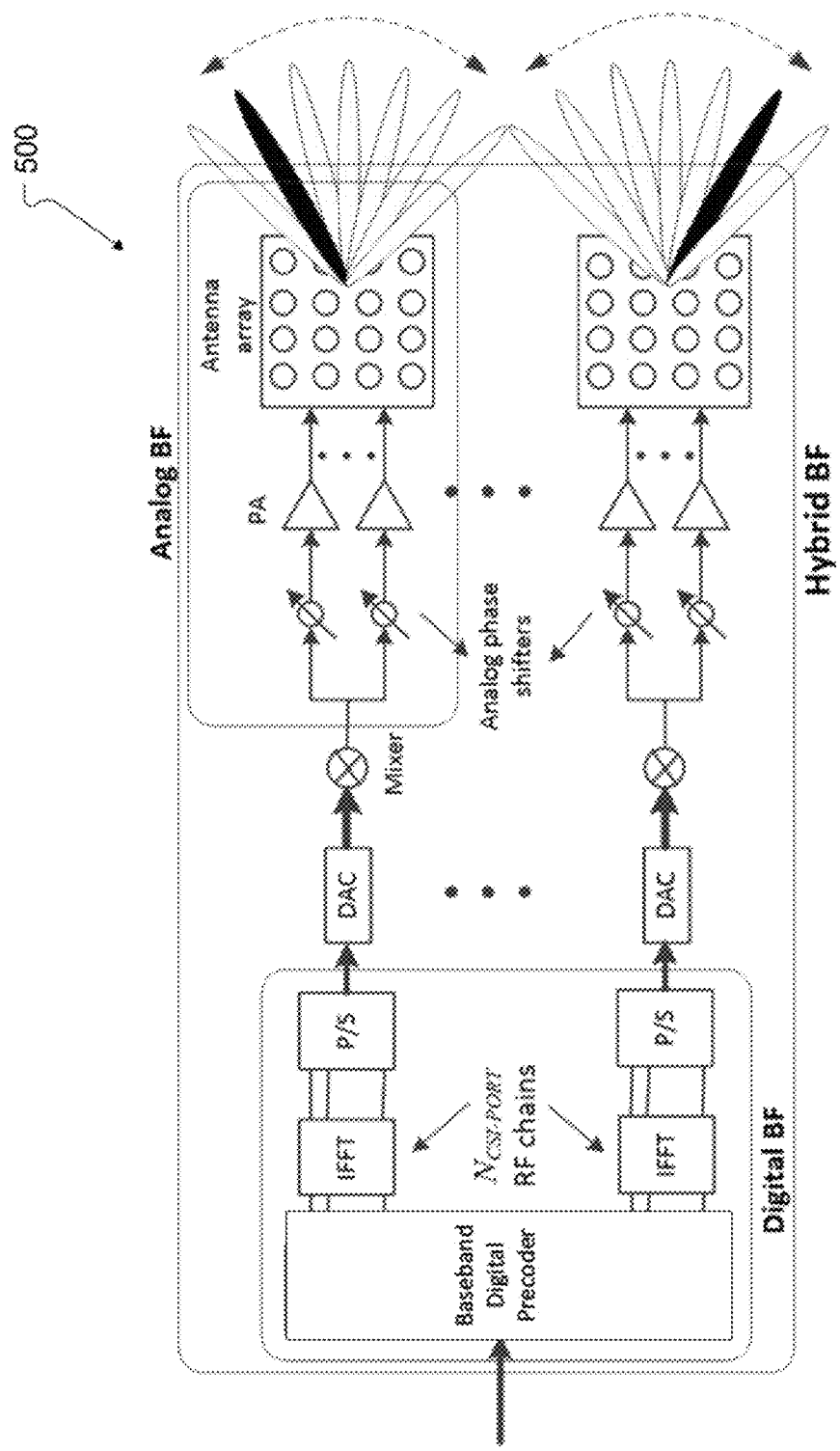
FIG. 5 illustrates an exemplary mm-wave communication system according to various embodiments of this disclosure.

FIG. 5 illustrates an exemplary mm-wave communication system according to various embodiments of this disclosure. Communication system 500 can be implemented in a BS, such as BS 102 in FIG. 2 and/or in a UE, such as UE 116 in FIG. 3.

For mmWave parts, the number of antenna elements can be large for a given form factor. However, the number of digitally chain to be limited due to hardware constraints (such as the feasibility to install a large number of ADCs/DACs at mmWave frequencies) as illustrated in FIG. 5. In this case, one digital chain is mapped onto a large number of antenna elements which can be controlled by a bank of analog phase shifters. One digital chain can then correspond to one sub-array which produces a narrow analog beam through analog beamforming. This analog beam can be configured to sweep across a wider range of angles by varying the phase shifter bank across a transmission time interval.

A gNB could utilize one or multiple transmit beams to cover the whole area of one cell. The gNB may form a transmit beam by applying suitable gains and phase settings to an antenna array. The transmit gain, i.e., the amplification of the power of the transmitted signal provided by a transmit beam, is typically inversely proportional to the width or area covered by the beam. At lower carrier frequencies, the more benign propagation losses may make it feasible for gNB to provide coverage with a single transmit beam, i.e., ensure adequate received signal quality at all UE locations within the coverage area via the usage of a single transmit beam. In other words, at lower transmit signal carrier frequencies, the transmit power amplification provided by the transmit beam with a width large enough to cover the area may be sufficient to overcome the propagation losses to ensure adequate received signal quality at all UE locations within the coverage area. However, at higher signal carrier frequencies, the transmit beam power amplification corresponding to the same coverage area may not be sufficient to overcome the higher propagation losses, resulting in a degradation of received signal quality at UE locations within the coverage area. In order to overcome such a received signal quality degradation, the gNB may form a number of transmit beams, each providing coverage over a region narrower than the overall coverage region, but providing the transmit power amplification sufficient to overcome the higher signal propagation loss due to the usage of higher transmit signal carrier frequencies. The UE may also form receive beams to increase the signal-to-interference-and-noise ratio (SINR) at the receiver. Likewise, in the uplink, the UE may form transmit beams and the gNB may form receive beams.

To assist the UE in determining its RX and/or TX beam, a beam sweeping procedure is employed consisting of the gNB transmitting a set of transmit beams to sweep the cell area and the UE measuring the signal quality on different beams using its receive beams. To facilitate candidate beam identification, beam measurement and beam quality reporting, the gNB configures the UE with one or more RS resource (e.g. SS Block, Periodic/Aperiodic/Semi-Persistent CSI-RS resources or CRIs) corresponding to a set of TX beams. An RS resource refers to a reference signal transmission on a combination of one or more time (OFDM symbol)/frequency (resource element)/spatial (antenna port) domain locations. For each RX beam, the UE reports different TX beams received using that RX beam, ranked in order of signal strength (RSRP) and optionally CSI (CQI/PMI/RI)). Based on the UE's measurement report feedback, the gNB indicates the UE with one or more Transmission Configuration Indicator (TCI) states for reception of PDCCH and/or PDSCH.

Figure 6:
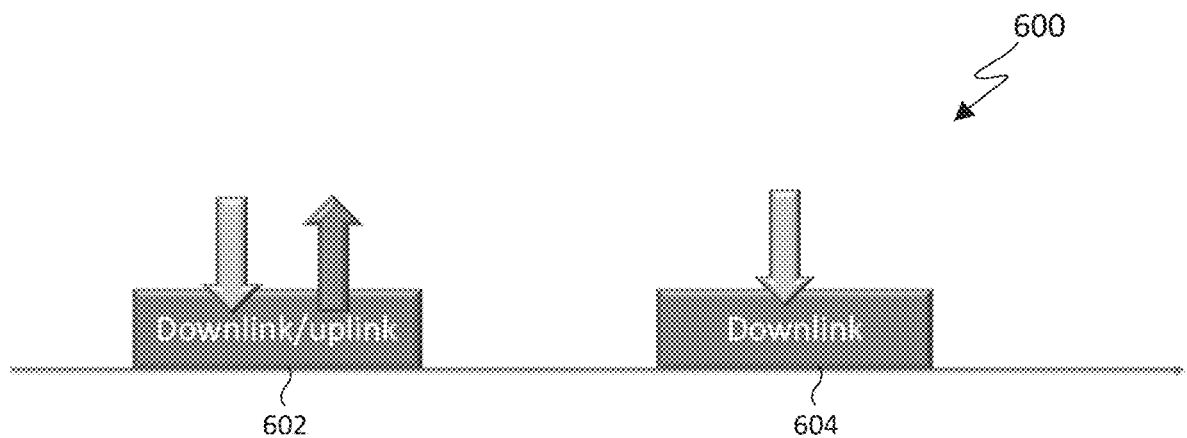
FIG. 6 illustrates a combination of frequency parts in which an antenna array can operate according to various embodiments of this disclosure.

FIG. 6 illustrates a combination of frequency parts in which an antenna array can operate according to various embodiments of this disclosure. For example, frequency part 602 can be used for both DL and UL communications. In some embodiments, additional bandwidth may be necessary for DL communications, in which case frequency part 604 can also be used for DL communications so that an antenna array, such as the antenna arrays 700, 800, and 900 in FIGS. 7, 8, and 9, respectively, can operate in a combination of frequency parts 600. In one embodiment, frequency part 602 is the 28 GHz frequency part and frequency part 604 is the 39 GHz frequency part.

Figure 7:
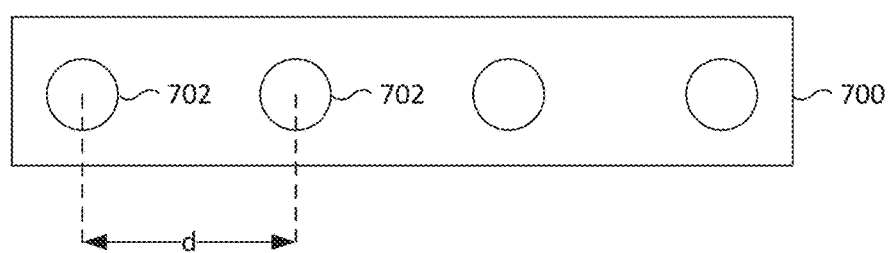
FIG. 7 illustrates an antenna array operating in a combination of frequency parts according to various embodiments of this disclosure.

FIG. 7 illustrates an antenna array configured to operate in a combination of frequency parts according to various embodiments of this disclosure. Antenna array 700 can be implemented in an electronic device, such as in BS 102 in FIG. 2 or in UE 117 in FIG. 3. For example, antenna array 700 can be antenna 280 in FIG. 2 or antenna 305 in FIG. 3.

Figure 10A:
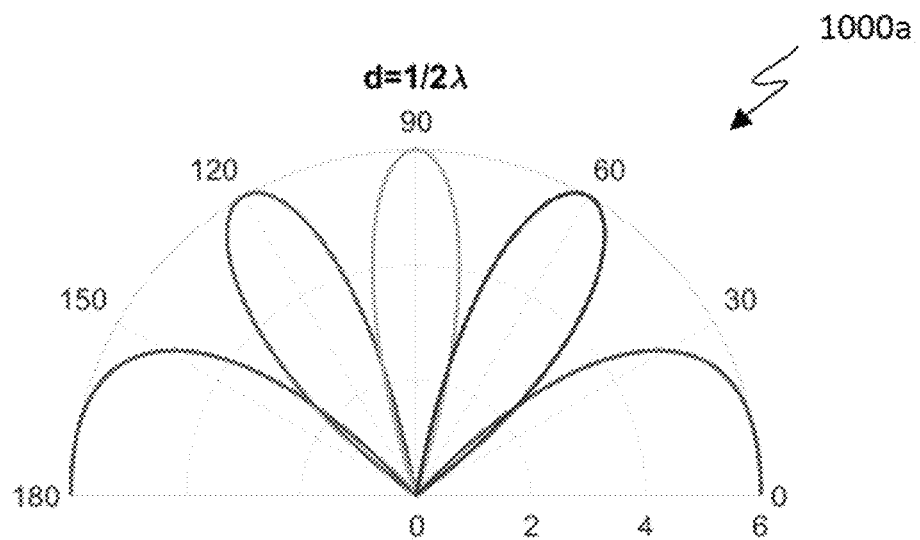
FIGS. 10A, 10B, and 10C illustrate different radiation patterns for a DFT codebook applied to an antenna array in different frequency parts according to various embodiments of this disclosure.
Figure 10B:
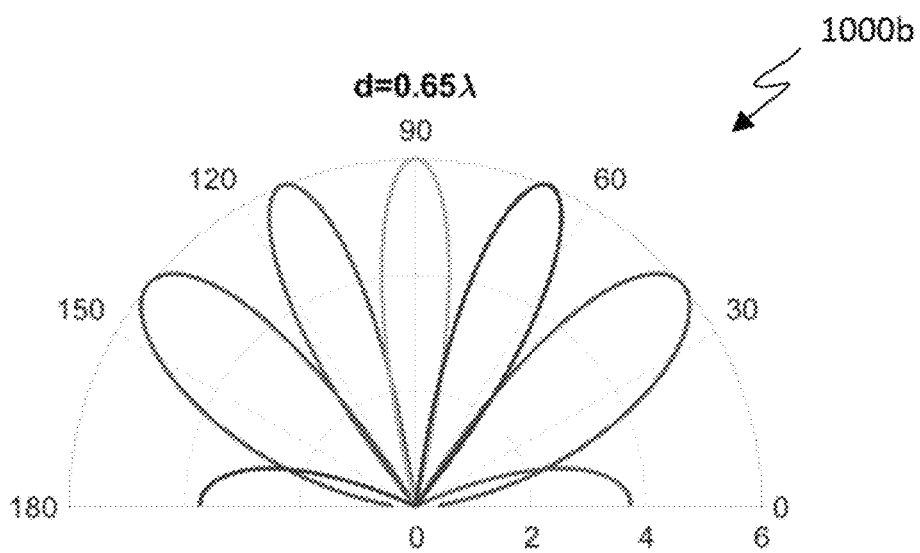
Figure 10C:
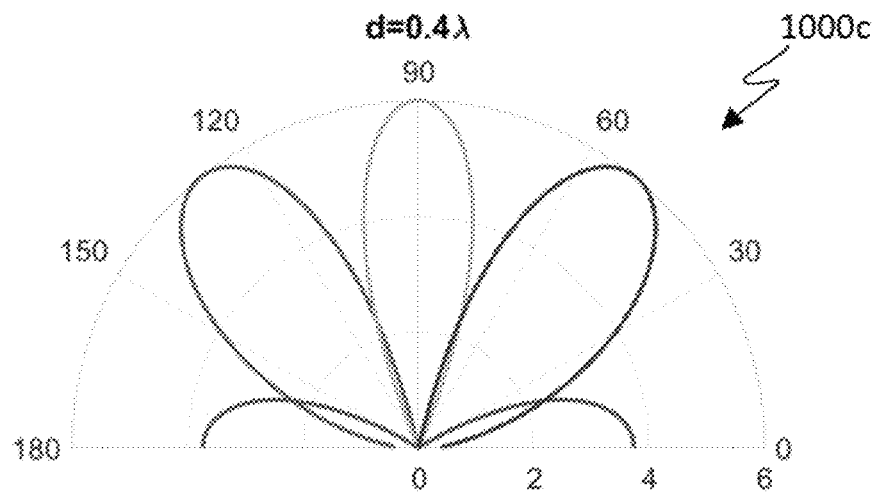

Antenna array 700 includes a plurality of antenna elements 702 arranged in a 1×4 linear array with a horizontal spacing d separating each antenna element 702 from an adjacent antenna element 702. As previously discussed, the beamforming patterns associated with antenna array 700 can change based on the relationship between the distance d and the frequency part in which the antenna array 700 is operating. For example, d=5 mm is equal to half-wavelength (i.e., 0.5λ) at 30 GHz, but 0.4λ at the 24 GHz, and 0.65λ at the 39 GHz. Thus, the beamforming pattern can change based on the frequency part in which the common antenna array is operating. The different beamforming patterns for antenna array 700 with d=5 mm for the 30 GHz, 24 GHz, and 39 GHz frequency parts are depicted in FIG. 10A-10C that follow.

Figure 8:
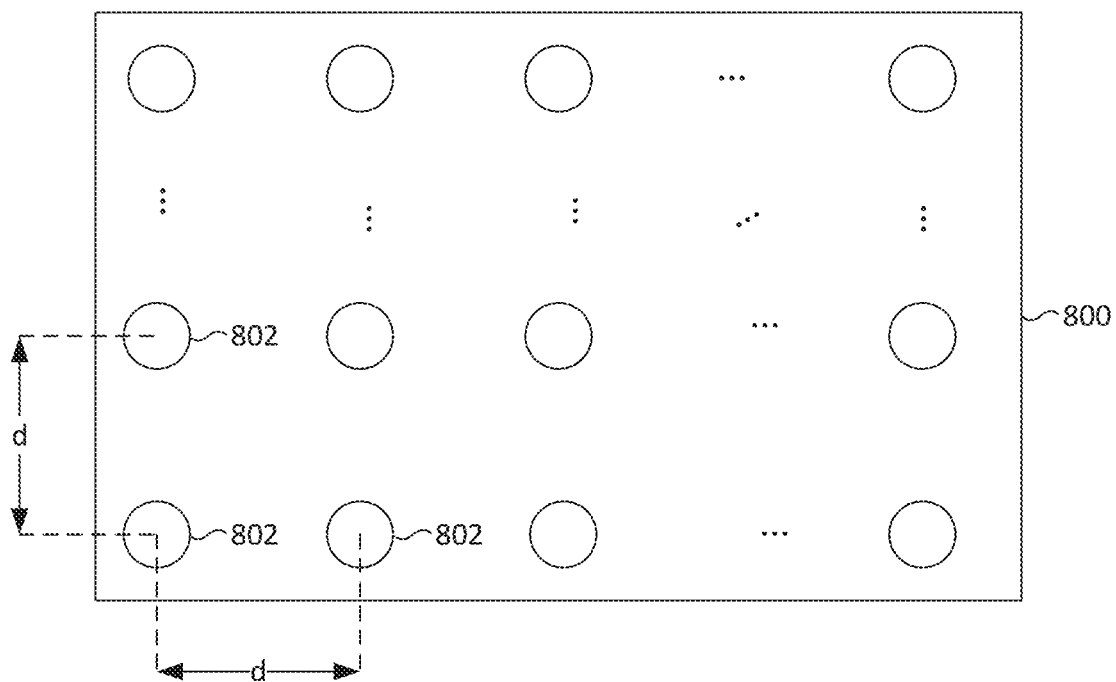
FIG. 8 illustrates another antenna array operating in a combination of frequency parts according to various embodiments of this disclosure.

FIG. 8 illustrates another antenna array configured to operate in a combination of frequency parts according to various embodiments of this disclosure. Antenna array 800 can be implemented in an electronic device, such as in BS 102 in FIG. 2 or in UE 116 in FIG. 3. For example, antenna array 700 can be antenna 280 in FIG. 2 or antenna 305 in FIG. 3.

Antenna array 800 includes a plurality of antenna elements 802 arranged in an N×M planar array with N>1 and M>1. Each of the antenna elements 802 is separated from an adjacent antenna element 802 in a same column by a distance d, and each of the antenna elements 802 is separated from an adjacent antenna element 802 in a same row by the same distance d. As an example, if d=5 mm, then d is equal to 0.5λ at 30 GHz, but 0.4λ at the 24 GHz, and 0.65λ at the 39 GHz.

Figure 9:
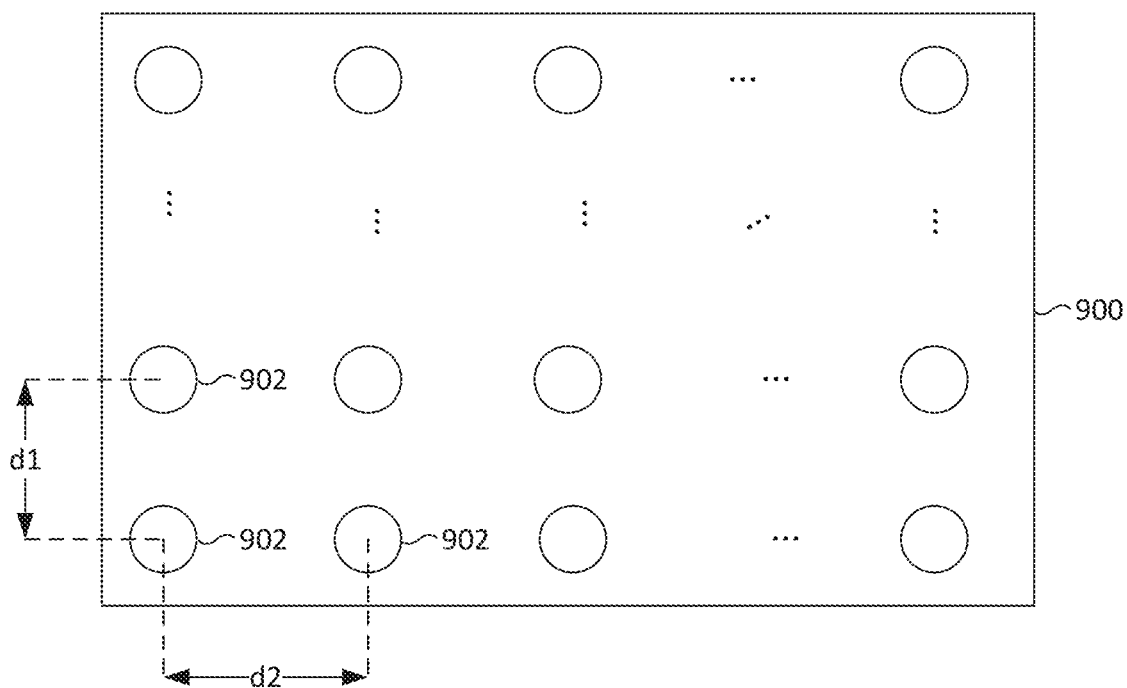
FIG. 9 illustrates yet another antenna array operating in a combination of frequency parts according to various embodiments of this disclosure.

FIG. 9 illustrates yet another antenna array configured to operate in a combination of frequency parts according to various embodiments of this disclosure. Antenna array 900 can be implemented in an electronic device, such as in BS 102 in FIG. 2 or in UE 116 in FIG. 3. For example, antenna array 700 can be antenna 280 in FIG. 2 or antenna 305 in FIG. 3.

Antenna array 900 includes a plurality of antenna elements 902 arranged in an N×M planar array with N>1 and M>1. Each of the antenna elements 902 is separated from an adjacent antenna element 902 in a same column by a distance d1, and each of the antenna elements 902 is separated from an adjacent antenna element 902 in a same row by the same distance d2 where d1 is not equal to d2. For example, d1 can be equal to 0.5λ at 39 GHz and d2 can be equal to 0.5λ at 30 GHz. The different spacing can be taken into account in the codebook design.

The larger-than or less-than half-wavelength antenna spacing results in a change of beamforming pattern. As shown in FIGS. 10A-10C, the same DFT codebook is applied to the same antenna array, but the radiation pattern changes significantly with frequency.

FIGS. 10A, 10B, and 10C illustrate different radiation patterns for a DFT codebook applied to an antenna array in different frequency parts according to various embodiments of this disclosure. In particular, the antenna array is a 1×4 antenna array such as antenna array 700 in FIG. 7.

FIG. 10A illustrates a radiation pattern 1000a for antenna array 700 operating in the 30 GHz frequency part with a distance d between antenna array elements equal to 0.5λ. FIG. 10B illustrates a radiation pattern 1000b for an antenna array 700 operating in the 39 GHz frequency part with a distance d between antenna array elements equal to 0.65λ. FIG. 10C illustrates a radiation pattern 1000c for an antenna array 700 operating in the 24 GHz frequency part with a distance d between antenna array elements equal to 0.4λ. As seen from a comparison of FIGS. 10A-10C, the peak direction drifts and the 3 dB beam width reduces as the frequency increases. For example, the beam pointing in the direction of 60° at half wavelength spacing will point to the direction of 50° or 70°. Additionally, the radiation gain of the DFT codebook is small around 0° and 180° if the antenna spacing is not equal to 0.5λ. As a result, a codebook designed for one frequency part may not work well in other frequency parts.

UE Multi-Band Operation

In one embodiment, the UE first identifies the frequency part or the frequency part combination in which it can operate. The device then reports to the network the capability its capability of supporting multi-band simultaneous transmission and reception, and the supported frequency part combinations. The report can be done through PUCCH channel. Next, the UE identifies the current operating frequency part combination based on the configuration received from the network. UE then selects a beam codebook from the plurality of beam codebooks, or generates a beam codebook, based on operating conditions/considerations. The UE then applies the selected codebook or newly-generated codebook. The multi-band operation procedures at the device are described in the figure that follows. Note that the operating frequency part or part combination of the device, the operating conditions/considerations can change with time and thus the selected/generated codebook can switch with time.

Figure 11:
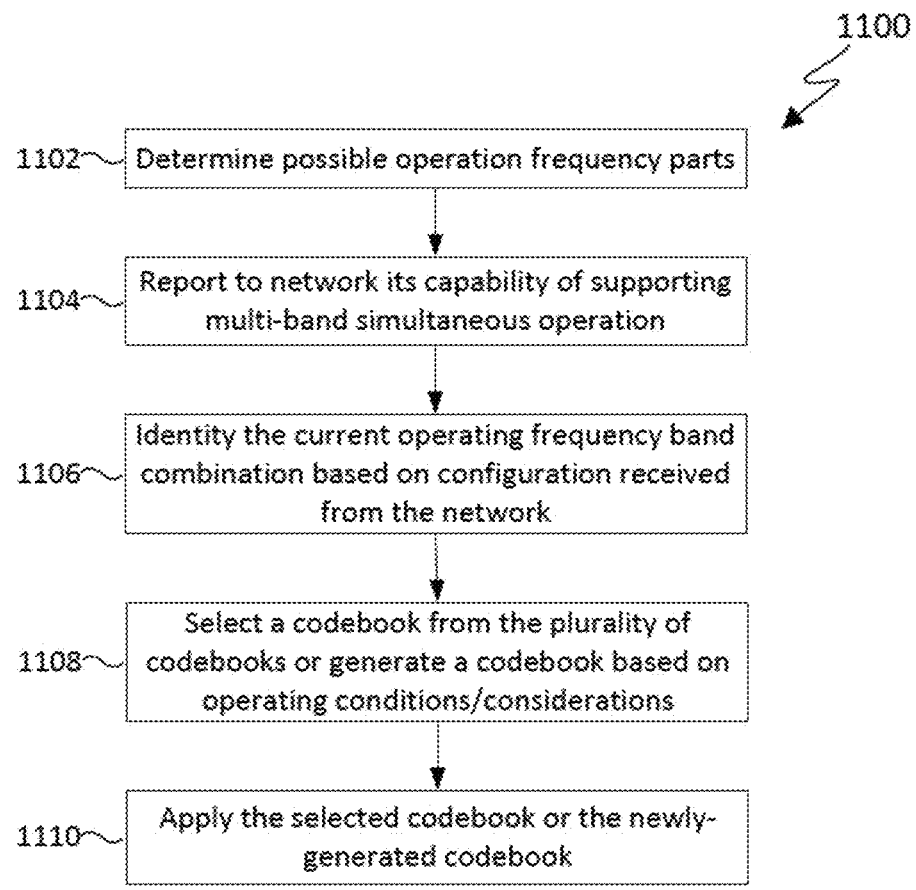
FIG. 11 is a flowchart for communication over multiple frequency parts according to various embodiments of this disclosure.

FIG. 11 is a flowchart for communication over multiple frequency parts according to various embodiments of this disclosure. Operations of flowchart 1100 can be implemented in an electronic device, such as BS 102 in FIG. 2 or UE 116 in FIG. 3.

Flowchart 1100 begins in operation 1102 by determining the possible operation frequency parts. In operation 1104, the capability of supporting multi-band simultaneous operation is reported to the network. In operation 1106, the current operating frequency band combination is identified based on a configuration received from the network. In operation 1108, a codebook is obtained based on operating conditions/considerations. In one embodiment, the codebook is obtained by selecting one of a plurality of codebooks stored in memory. In another embodiment, the codebook is obtained by generating a codebook. In operation 1110, the obtained codebook is applied.

In one embodiment, the possible operating frequency parts, denoted as $\{f_1, f_2, \ldots f_N\}$, supported by the transceiver are identified based on the transceiver array structure and transceiver gain, including the antenna element spacing, wavelength of the carrier frequency and the radiation efficiency, etc. For example, the frequency parts, where the carrier frequency wavelength are close to or on the same order of antenna spacing of the transceiver, are supported by the transceiver. The supported frequency parts can be determined by checking the radiation efficiency at the frequency part. The radiation efficiency can be decided in the measurement or electromagnetic simulation. If the antenna radiation efficiency at a frequency part is good enough for transmit and receive in the cellular network, the frequency part is identified as a candidate frequency part for operation.

Consideration of Downlink/Uplink

For wireless communication systems such as 5G, inter-band carrier aggregation is supported. In one embodiment, the operating frequency parts or frequency part combinations for the uplink and the downlink can be different, and therefore different codebooks for the uplink and downlink can be used. An electronic device can choose the codebook according to its operating uplink part or frequency part combination and operating downlink part or frequency part combination.

Figure 12:
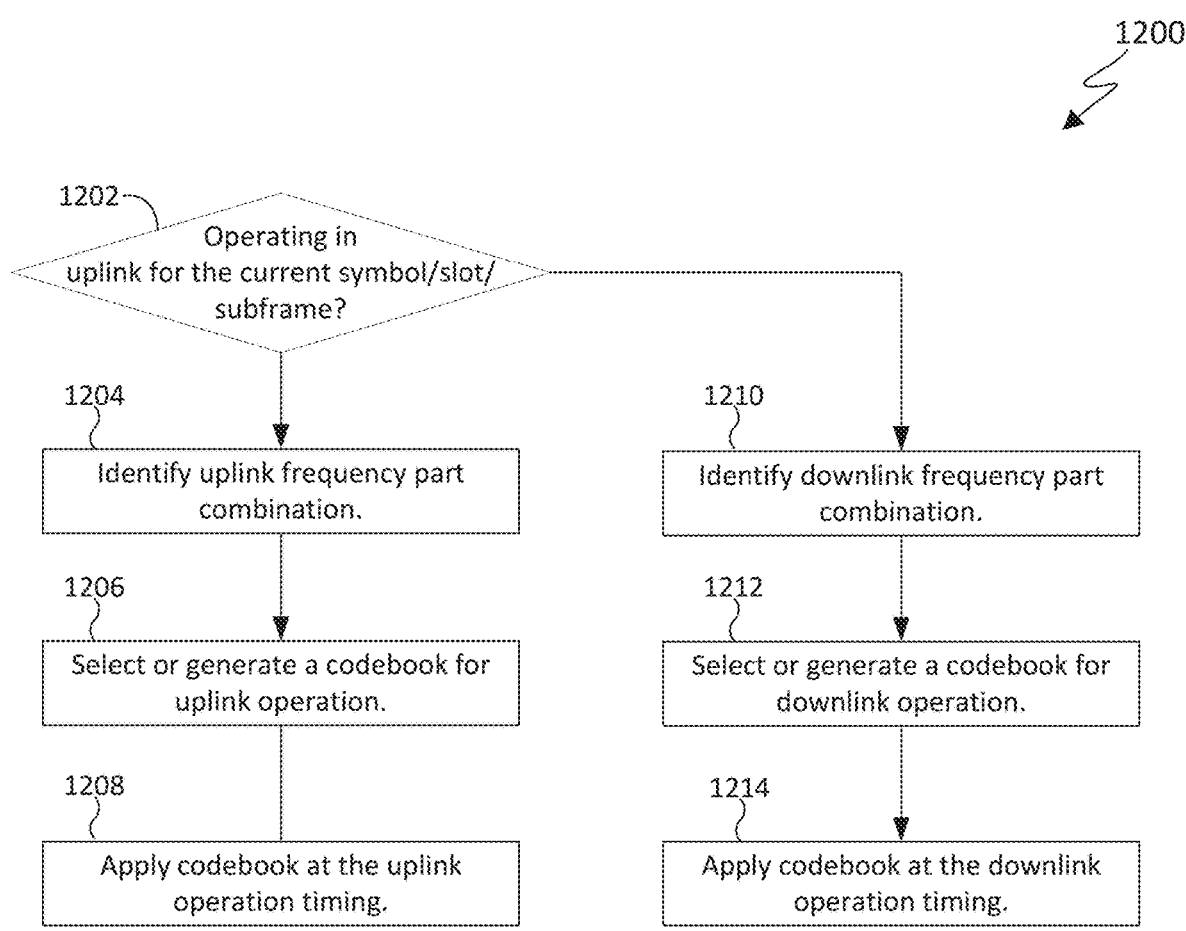
FIG. 12 illustrates a flowchart for obtaining a codebook for an antenna array operating in a combination of frequency parts according to various embodiments of this disclosure.

FIG. 12 illustrates a flowchart for obtaining a codebook for an antenna array operating in a combination of frequency parts according to various embodiments of this disclosure. Operations of flowchart 1200 can be implemented in an electronic device such as BS 102 in FIG. 2 or UE 116 in FIG. 3.

Flowchart 1200 begins at operation 1202 by determining whether the electronic device is operating in the uplink for the current symbol/slot/subframe. If the electronic device is operating in the uplink for the current symbol/slot/subframe, then flowchart 1200 proceeds to operation 1202 where the uplink frequency part or frequency part combination is identified. In operation 1206, a codebook is selected or generated for uplink operation, and in operation 1208 the selected or generated codebook is applied for uplink operation timing.

Returning to operation 1202, if the determination is made that the electronic device is not operating in the uplink for the current symbol/slot/subframe, then flowchart 1200 proceeds to operation 1210 where a downlink frequency part or frequency part combination is identified. In operation 1212 a codebook is selected or generated for downlink operation, and in operation 1214 the selected or generated codebook is applied for downlink operation timing.

Figure 14:
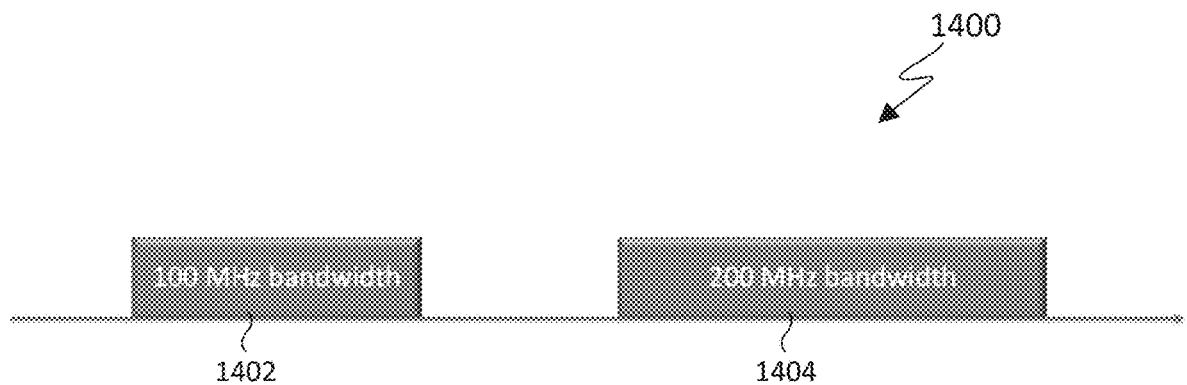
FIG. 14 illustrates a frequency part combination in which an antenna array can operate according to various embodiments of this disclosure.

In an example according to FIG. 12, an electronic device operating in a TDD system can operate in either downlink or uplink for a given time slot. The electronic device may use both 28 GHz and 39 GHz parts for the downlink reception but only 28 GHz for uplink transmission. The electronic device can employ the codebook corresponding to 28 GHz and 39 GHz for downlink reception, and employ the codebook for 28 GHz for uplink transmission. However, the application of separate codebooks for UL operations and DL operations can result in increased overhead due to the frequency in which an electronic device transitions between UL and DL. For example, seven different UL/DL frame configurations are shown in FIG. 14 for 5G TDD transmission. Switching between UL and DL occurs at the boundary between subframes identified with the letter U and the letter D, which represents an UL frame and a DL frame, respectively. Frequent switching between UL and DL codebooks incur increased overhead in terms of higher power consumption and increased latency.

Figure 13:
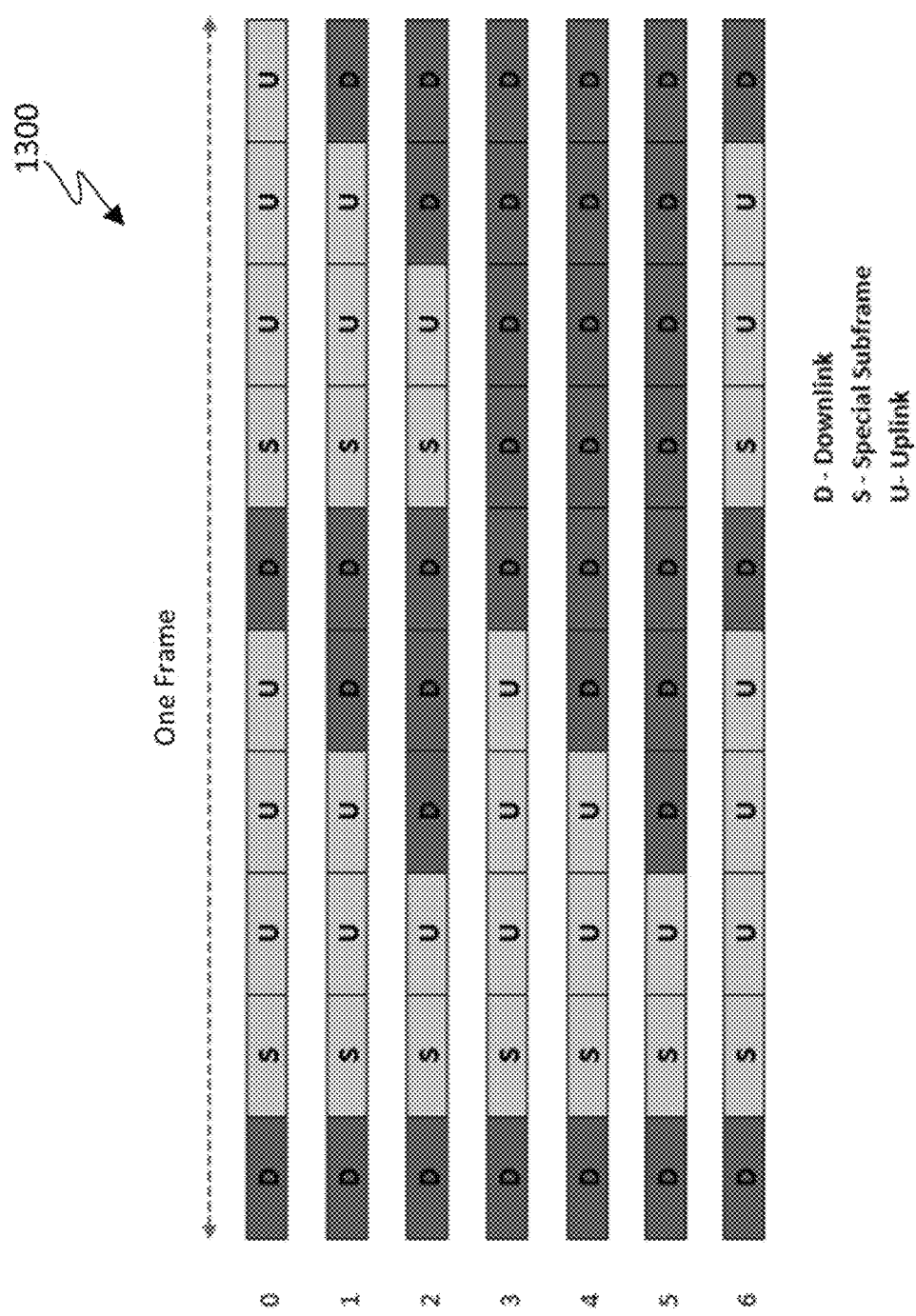
FIG. 13 illustrates UL/DL frame configurations for 5G TDD transmission.

FIG. 13 illustrates UL/DL frame configurations for 5G TDD transmission. Electronic devices, such as BS 102 in FIG. 2 or UE 116 in FIG. 3, can communicate in a wireless network using one of the UL/DL frame configurations 1300. As already discussed, in the embodiment where separate codebooks are used for UL communications and DL communications, changing between UL and DL subframes according to any one of the UL/DL frame configurations 1300 results in changing between UL and DL codebooks, increasing overhead.

In another embodiment, the electronic device, such as a UE, can use the same beam or codebook for downlink and uplink operations, even though the uplink and downlink frequency part combination is different. For example, the beam correspondence between downlink and uplink can be more easily determined if the same codebook is used for both downlink and uplink, simplifying joint downlink-uplink beam management for the network and reduce the overhead of beam codebook change. In this case, even though the frequency part combinations are different for downlink and uplink, the electronic device selects or generates the same codebook for both downlink and uplink operations.

In one approach, the UE can select the codebook based on the downlink frequency part combination and applies the same codebook for uplink operations even though the uplink frequency part combination may not be the same as that of downlink. For example, the UE may use both 28 GHz and 39 GHz parts for the downlink reception but only 28 GHz for uplink transmission. In this approach, the UE can employ the codebook corresponding to 28 GHz and 39 GHz for downlink reception, and employ the same codebook (also corresponding to 28 GHz and 39 GHz) for 28 GHz uplink transmission. An advantage of this approach is that the beam codebook selected can be more optimized for downlink operation which can be beneficial to increase downlink data rate.

In another approach, the UE selects the codebook based on the uplink frequency part combination and applies the same codebook for downlink operation, although the downlink frequency part combination may not be the same as that of uplink. For example, the UE may use both 28 GHz and 39 GHz parts for the downlink reception but only 28 GHz for uplink transmission. In this approach, the UE can employ the codebook corresponding to 28 GHz for downlink reception and uplink transmission. An advantage of this approach is that the beam codebook selected can be more optimized for uplink operation which can be beneficial to improve the uplink link quality.

In yet another approach, whether the UE selects the codebook based on the operating downlink frequency part combination or the operating uplink frequency part combination can depend on conditions such as the downlink signal strength/quality (RSRP/SNR/SINR) and the uplink signal strength/quality (RSRP/SNR/SINR), the desired/required data rates for downlink and for uplink, the desired/required latencies for downlink and for uplink and so on. If the signal strength/quality, or data rate, or latency, or a performance metric combination one or more the aforementioned metrics requires is more critical for downlink, compared to that for uplink, then the codebook corresponding to the downlink frequency part combination can be selected. Likewise, if the signal strength/quality, or data rate, or latency, or a performance metric combination one or more the aforementioned metrics requires is more critical for uplink, compared to that for downlink, then the codebook corresponding to the downlink frequency part combination can be selected.

In a non-limiting embodiment, an electronic device with an antenna array operating in a frequency part combination that includes the 28 GHz frequency part for downlink and the 24 GHz frequency part for uplink, then the electronic device can select the codebook for the {28 GHz} frequency part, the codebook for the {24 GHz} frequency part, or the {24 GHz, 28 GHz} frequency parts.

In another approach, the electronic device selects the codebook corresponding to the union of the frequency part or part combinations for downlink and uplink. For example, a UE may use both 39 GHz and 60 GHz frequency parts for the downlink reception but only 28 GHz frequency part for uplink transmission. In this approach, the UE employs the codebook corresponding to frequency part combination of 28 GHz, 39 GHz and 60 GHz for both downlink and uplink operations.

Other Operating Conditions and Considerations

In another approach, the UE selects or generates a codebook design based on the priority of the multiple frequency parts. For example, the importance can be determined by the bandwidth of each band, the path loss of each band, the UE antenna radiation efficiency at each band, the latency/throughput requirement at each part, etc. For example, the codebook selection is done by pick a codebook maximizing the weighted sum of the performance at each frequency part. For example, the codebook is selected or generated to maximize a criteria that is the weighted beamforming gain across the operating frequency parts. Denote Gain(W, $f_i$) as the average beamforming gain of the codebook W at the frequency part $f_i$. The weighted beamforming gain across the operating frequency parts are:

$$\sum_i a_i * \text{Gain}(W, f_i)$$

where the summation is over the operating frequency part. The weights at the i-th frequency part $a_i$ are determined by the priority of the frequency parts. For example, the weight can be proportional to the bandwidth of the frequency part.

Another method is to select or design the codebook to maximize the minimum of weighted beamforming gain across the frequency parts. Mathematically, the codebook that maximizing $$\min_i a_i * \text{Gain}(W, f_i)$$

is selected.

In one embodiment, UE identifies the frequency part combination of PDCCH or PUCCH channel, and selects or generates the codebook designed for the frequency part combination of PDCCH or PUCCH channel. The control channel PDCCH or PUCCH are critical to maintain the connection and should prioritized.

In the process of initial access, UE determines the frequency part combination to perform initial access, and selects or generates codebook corresponding to the frequency part combination.

In the process of random access, UE determines the frequency part combination configured with random access resource, and selects or generates codebook corresponding to the frequency part combination.

In one embodiment, the frequency part combination for codebook selection and generation is based on carrier aggregation operation. The possible options of the UE include but not limited to: (1) UE determines the frequency part combination containing the PCell (primary cell), and selects or generates codebook corresponding to the frequency part combination; (2) UE determines the frequency part combination containing the PCell, and configured SCells (secondary cells), and selects or generates codebook corresponding to the frequency part combination; (3) UE determines the frequency part combination containing the PCell, and activated SCells, and selects or generates codebook corresponding to the frequency part combination; and (4) Upon intra-NR handover to change PCell, UE selects or generates codebook corresponding to the frequency part of the target PCell.

In one embodiment, the frequency part combination for codebook selection and generation is based on bandwidth adaptation operation. For example, UE determines the frequency part containing the active BWP(s) (bandwidth part(s)), and selects or generates codebook corresponding to the frequency part.

In one embodiment, the frequency part combination for codebook selection and generation is based on dual connectivity operation. The possible options of the UE include but not limited to: (1) UE determines the frequency part combination containing the MCG (Master Cell Group), and selects or generates codebook corresponding to the frequency part combination; and/or (2) UE determines the frequency part combination containing the PCell and the PSCell (or the SpCell), and selects or generates codebook corresponding to the frequency part combination.

BS Codebook Selection Operation

In one approach, the BS selects or generates the codebook based on the downlink frequency part combination and applies the same codebook for uplink operation, although the uplink frequency part combination may not be the same as that of downlink. For example, the BS may use both 28 GHz and 39 GHz bands for the downlink transmission but only 28 GHz for uplink reception. In this approach, the BS can employ the codebook corresponding to 28 GHz and 39 GHz for downlink transmission, and employ the same codebook (also corresponding to 28 GHz and 39 GHz) for 28 GHz uplink reception. An advantage of this approach is that the beam codebook selected can be more optimized for downlink operation which can be beneficial to increase downlink data rate.

In another approach, the BS selects or generates the codebook based on the uplink frequency part combination and applies the same codebook for downlink operation, although the downlink frequency part/part combination may not be the same as that of uplink. For example, the BS may use both 28 GHz and 39 GHz bands for the downlink transmission but only 28 GHz for uplink reception. In this approach, the BS can employ the codebook corresponding to 28 GHz for downlink transmission and uplink reception. An advantage of this approach is that the beam codebook selected can be more optimized for uplink operation which can be beneficial to improve the uplink link quality.

In another approach, whether the BS selects or generates the codebook based on the operating downlink frequency part combination or the operating uplink frequency part/combination can depend on conditions such as the downlink signal strength/quality (RSRP/SNR/SINR) and the uplink signal strength/quality (RSRP/SNR/SINR), the desired/required data rates for downlink and for uplink, the desired/required latencies for downlink and for uplink and so on. If the signal strength/quality, or data rate, or latency, or a performance metric combination one or more the aforementioned metrics requires is more critical for downlink, compared to that for uplink, then the codebook corresponding to the downlink frequency part/part combination is selected. Likewise, if the signal strength/quality, or data rate, or latency, or a performance metric combination one or more the aforementioned metrics requires is more critical for uplink, compared to that for downlink, then the codebook corresponding to the downlink frequency part/part combination is selected.

In another approach, the BS selects or generates a codebook corresponding to the union of the frequency part combinations for downlink. For example, the BS may use both 39 GHz and 60 GHz bands for the downlink reception but only 28 GHz for uplink transmission. In this approach, the BS employs the codebook corresponding to frequency part combination of 28 GHz, 39 GHz and 60 GHz for both downlink and uplink operations.

In another approach, the BS selects or generates a codebook design based on the priority of the multiple frequency parts. For example, the importance can be determined by the number of users operating in each part, the bandwidth of each frequency part, the path loss of each frequency part, the BS antenna radiation efficiency at each frequency part, the latency requirement at each frequency part, etc.

In yet another approach, the frequency part combination for codebook selection and generation is based on carrier aggregation operation, bandwidth adaptation operation and dual connectivity operation, and others. The procedure and options are similar as the case of UE.

FIG. 14 illustrates a frequency part combination in which an antenna array can operate according to various embodiments of this disclosure. Frequency part combination 1400 includes a first frequency part 1402 and a second frequency part 1404. In this example in FIG. 14, frequency part 1402 corresponds to the 28 GHz part and has a 100 MHz bandwidth. Frequency part 1404 corresponds to the 39 GHz part and has a 200 MHz bandwidth. These frequency parts and corresponding bandwidths are illustrative and should not be deemed limiting.

An electronic device can select a codebook for frequency part combination 1400 based on a number of different criteria. For example, the electronic device can select a codebook for frequency part combination 1400 based on the bandwidth of each frequency part, the path loss of each frequency part, the antenna radiation efficiency at each frequency part, or the latency requirement at each frequency part. In a particular example, an electronic device can select a codebook for frequency part 1404 on the basis that it has a larger bandwidth.

Design of Multi-Band Codebooks

In one embodiment, the codebooks for a set of frequency part combinations are generated and saved for UE selection. For instance, if there are three bands, 24 GHz, 28 GHz and 39 GHz. There can be up to 7 different codebooks, operating in the 24 GHz, 28 GHz, 39 GHz, {24 GHz, 28 GHz}, {24 GHz, 39 GHz}, {28 GHz, 39 GHz}, {24 GHz, 28 GHz, 39 GHz}, respectively. In general, there are at most $2^N-1$ non-empty subsets of the set $\{f_1, f_2, \ldots f_N\}$. Therefore, at most $2^N-1$ codebooks can be generated. The generated codebooks can be saved to the device's memory.

Figure 15:
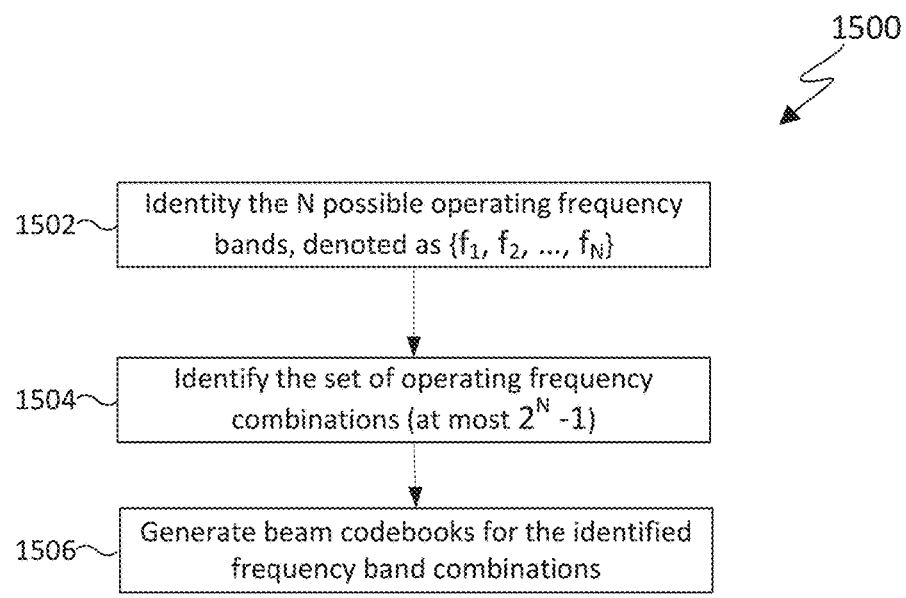
FIG. 15 illustrates a flowchart for generating a multi-band beamforming codebook for an antenna array operating in a combination of frequency parts according to various embodiments of this disclosure.

FIG. 15 illustrates a flowchart for generating a multi-band beamforming codebook for an antenna array operating in a combination of frequency parts according to various embodiments of this disclosure. Operations of flowchart 1500 can be implemented in a server, such as server 400 in FIG. 4.

Flowchart 1500 begins at operation 1502 by identifying the N possible frequency parts in which the antenna array can operate. The set of N possible frequency parts can be denoted as $\{f_1, f_2, \ldots f_N\}$. The multi-band beamforming codebooks can be generated based on the E-field data of each antenna element for each frequency part.

In operation 1504, the set of all frequency part combinations are identified. For N possible frequency parts, the set of all frequency part combinations is at most $2^N-1$. For example, if N=3 frequency parts (e.g., 24 GHz, 28 GHz, and 39 GHz), then there can be $2^3-1=7$ different codebooks that can be generated: {24 GHz}, {28 GHz}, {39 GHz}, {24 GHz, 28 GHz}, {24 GHz, 39 GHz}, {28 GHz, 39 GHz}, and {24 GHz, 28 GHz, 39 GHz}. The generated codebooks can be saved to the device's memory.

In operation 1506, codebooks are generated for the identified frequency part combinations.

In one embodiment, the codebook design is done offline and saved into device's memory for online selection. Electromagnetic response data of the device, and attributes and performance requirements of the multiple parts, including the bandwidth, path-loss, throughput requirement at each part, beamforming gain requirement at each part, etc.

In another embodiment, the codebook can be generated online to adapt to the online operation requirements/conditions/considerations, including the current priority of each frequency part, the latency/gain/throughput requirement of each frequency part.

For a given operating or interested frequency part set $\{f_1', f_2', \ldots f_K'\} \subset \{f_1, f_2, \ldots f_N\}$, Greedy and K-Means algorithm can be used to design a codebook operating in more than one frequency parts. Note that the algorithm can be executed for each of the frequency part combination of interest. For N frequency parts, the algorithm can be performed for $2^N-1$ times to generate the codebooks for all possible combinations of the frequency parts.

Codebook Design Based on a Combination of Two or More Frequency Parts

For a given operating or interested frequency part set $\{f_1, f_2, \ldots f_K\} \in \{f_1, f_2, \ldots f_N\}$, Greedy and K-Means method can be extended to design a codebook operating in a combination of two or more frequency parts. Note that the algorithm can be executed for each of the frequency part combination of interest. For N frequency parts, the algorithm can be performed for $2^N-1$ times to generate the codebooks for all possible combinations of the frequency parts.

Greedy Algorithm

The Greedy algorithm involves generating a pool of candidate beams and then selecting beams one by one from the pool of candidate beams to form a codebook. An exemplary flowchart for generating a codebook according to the Greedy algorithm is provided in the figure that follows.

Figure 16:
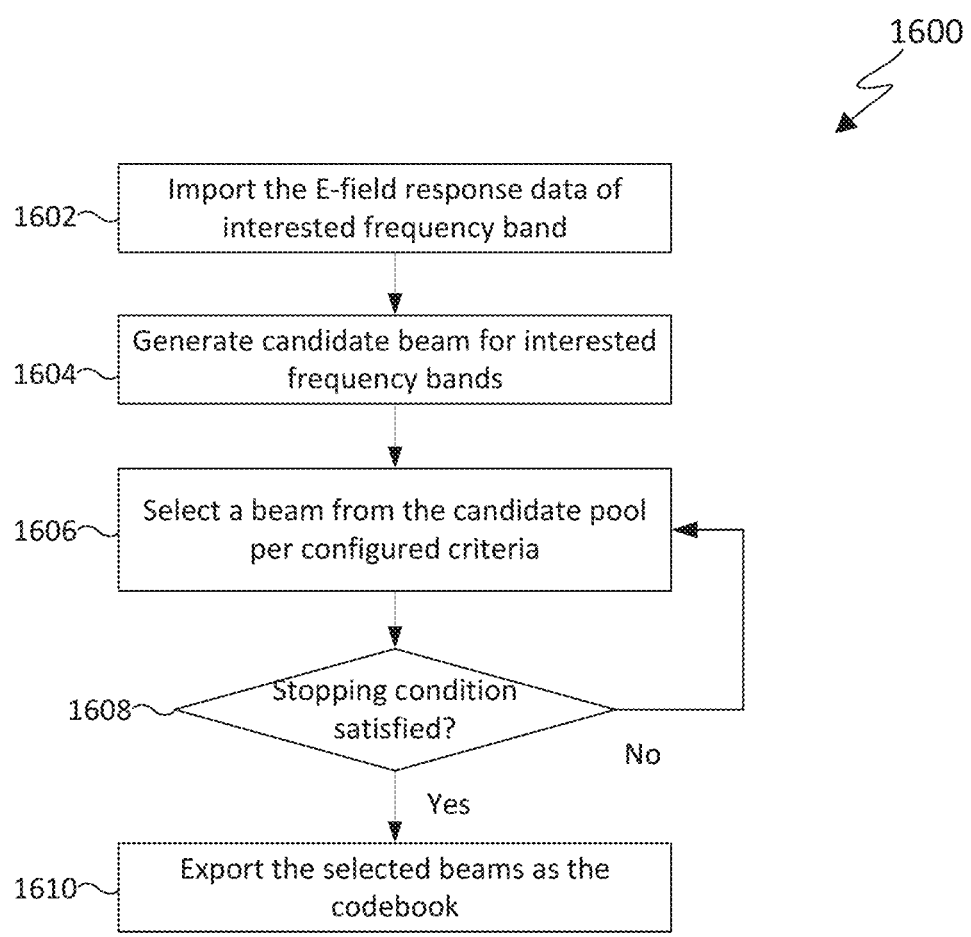
FIG. 16 is a flowchart for generating a codebook according to the Greedy algorithm.

FIG. 16 is a flowchart for generating a codebook according to the Greedy algorithm. The operations of flowchart 1600 can be implemented in a server, such as server 400 in FIG. 4.

Flowchart 1600 begins at operation 1602 by obtaining the E-field response data of the interested frequency part.

In operation 1604 candidate beams are generated for the interested frequency parts.

In operation 1606 a beam is selected from the candidate pool based on the configured criteria. In one embodiment, the selection criteria can include Max-Min, which involves identifying the composite radiation pattern of the current codebook at each frequency part from a frequency part combination of interest. The frequency part with the worst performance metric is identified and then a beam is selected from the remaining beams in the candidate pool which optimizes the performance of the current worst composite pattern. Thus, Max-Min attempts to maximize, e.g., increase, the gain over the frequency part combination that has the smallest mean beam gain:

$$\max_{w \in W_C} \min_{f \in \{f1, f2\}} \frac{1}{N} \sum_{i=1}^{N} w^H M_i^f w$$

where $w_c$ is the set of all candidate codewords.

In another embodiment, the selection criteria can include Max-Mean, which involves selecting the beam maximizing the average performance metric (or weighted average performance metric) of the composite radiation patterns across the frequency parts from a frequency part combination of interest:

$$\max_{w \in W_C} \overline{G}(w) := \frac{1}{2N} \sum_{f \in \{f1,f2\}} \sum_{i=1}^{N} w^H M_i^f w$$

where $w_c$ if the set of all candidate codewords.

The performance in the above selection criteria can be the mean gain, median gain, x-percentile CDF value, etc.

The detailed description of the above two example criteria is as follows. Denote w as the codewords and $W_d$ as the candidate pool. Denote that $\{(\theta_i, \phi_i)\}$ as the sampling points on the whole surface of the unit sphere, or a required coverage region. The radiation gain of beam w at sampling point i at frequency k is then denoted as $G_i^k(w)$.

The first beam for the case of Max-Min criterion is selected as $$\operatorname{argmax}_{\{w \in W_d\}} \min_k E_i[G_i^k(w)]$$

where E[•] is the mean operation.

Similarly, the first beam for the case of Max-Mean criterion is $$\operatorname{argmax}_{\{w \in W_d\}} E_k[a_k E_i[G_i^k(w)]]$$

where $a_k$ is the weight for the frequency part k.

In one embodiment, the value of $a_k$ is proportional to the bandwidth of the frequency parts. For example, the larger the bandwidth, the bigger the weight. In one embodiment, $e=BW_k$, where $BW_k$ is the bandwidth of frequency part k.

In another embodiment, the value of $a_k$ can be decided by the path loss at the frequency parts. For example, if the optimization criterion is to maximize the total throughput on multiple frequency parts, then the larger the path loss at the frequency part k, the smaller the weight $a_k$. On the other hand, if the objective is to minimize the difference between frequency parts, then a larger weight can be assigned to a frequency part with larger path loss.

In yet another embodiment, $a_k$ can be decided by the priority of the frequency parts. For example, the frequency parts of the control channel (i.e., PDCCH, PUCCH) can have higher priority, thus higher $a_k$ than the data channel (i.e., PDSCH, PUSCH). In the case of carrier aggregation, the frequency part containing the PCell has higher priority than the SCell.

In yet another embodiment, $a_k$ can be decided by the importance of the frequency parts in the cell served by the current BS. For example, if there are more users on a specific frequency part, then the weight for this frequency part can be larger than the other weights.

Denote the current codebook as $W_c$, which consists of all the beams that have been selected until now. The next beam to be added to the codebook for the case of Max-Min criterion is $$\operatorname{argmax}_{\{w \in W_d \backslash W_c\}} \min_k E_i[S_i^k(W_c \cup w)]$$

where $S_i^k(W) \triangleq \max_{w \in W} G_i^k(w)$ represents the composite radiation pattern of the codebook W at the sampling point i and frequency part k, and $W_d \backslash W_c$ represents the set of remaining beams in the candidate pool.

For the case of Max-Mean criterion, the next beam to be selected is, $$\operatorname{argmax}_{\{w \in W_d \backslash W_c\}} E_k[a_k E_i[S_i^k(W_c \cup w)]]$$

In operation 1608 a determination is made as to whether a stopping condition is satisfied. Stopping condition criterion defines the metric used to terminate the algorithm. The metrics are taken from the codebook design requirements. The codebook size is one embodiment of the criterion. The gain value at X %-tile CDF is another embodiment of the criterion, i.e. the algorithm stops after the gain value at the X %-tile CDF is reached. Yet another criterion is the mean gain of the composite radiation averaged over the parts reaches a threshold, or the minimum of the mean composite gain reaches a threshold. Another stopping criterion is that the objective function has converged.

If a stopping condition is not satisfied, then flowchart 1600 returns to operation 1606. However, if the stopping condition is satisfied, then flowchart 1600 proceeds from operation 1608 to operation 1610 where the selected beams are exported as the codebook.

K-Means Algorithm

The K-Means algorithm involves constructing E-field response matrices $M_i^k$ based on the E-field response data at every sampling point i and every frequency part k. The gain $G_i^k(w)$ can be derived as $w^H M_i^k w$. The K-Means algorithm is described in more detail in the figure that follows.

Figure 17:
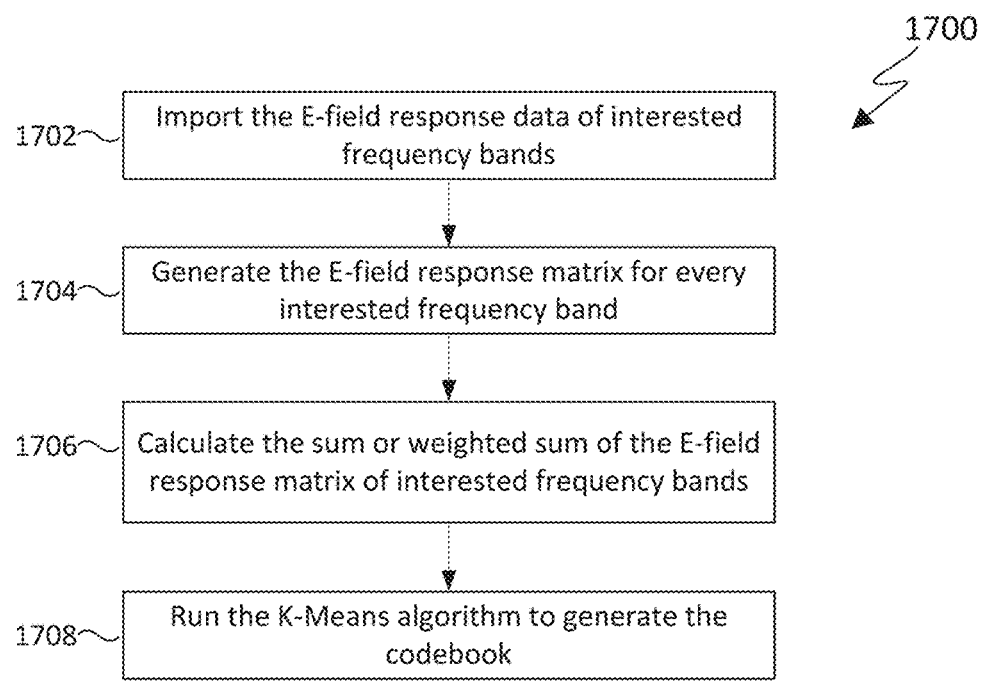
FIG. 17 is a flowchart of a process for generating a codebook according to the K-Means algorithm.

FIG. 17 is a flowchart of a process for generating a codebook according to the K-Means algorithm. The operations of flowchart 1700 can be implemented in a server, such as server 400 in FIG. 4.

Flowchart 1700 begins at operation 1702 by obtaining the E-field response data of the interested frequency parts.

In operation 1704 an E-field response matrix $M_i^k$ is generated for every interested frequency part.

In operation 1706, a sum or weight sum $M_i$ of the E-field response matrix is calculated for the interested frequency parts: $M_i = \Sigma_k a_k M_i^k$ where $a_k$ is the weight for frequency part k. The value of $a_k$ can be determined by following the similar method given in the above section on Greedy algorithm.

In operation 1708 the K-Means algorithm is run to generate the codebook. In one embodiment, the K-Means algorithm includes an assignment step in which each direction is assigned to the beam that has the largest gain. In other words, the set of directions are partitioned into K subsets:

$$D_k = \{(\theta, \varphi) | k = \operatorname{argmax}_{1 \leq j \leq K} f(\theta, \varphi)(w_j)\}.$$

The K-Means algorithm also includes an update step in which a new beam is optimized to serve all directions in every subset:

$$w_k = \operatorname{argmin}_k \sum_{(\theta, \varphi) \in D_k} f_{(\theta, \varphi)}(w)$$

$$\text{s.t. } \|w_l\| = 1/\sqrt{L}$$

$$Lw_l \in \{0, 1, \ldots 2^b - 1\} \times \frac{2\pi}{2^b}$$

Codebook Structure

The codebooks of different frequency part combinations can be non-exclusive so that it is included in more than one codebook, as can be seen in the figure that follows. As can be seen, codewords in the intersection of more than one codebook are used by multiple frequency parts. Additionally, a codebook for a frequency part combination can be the collection (i.e., the union) of all the codewords for each individual frequency part.

Figure 18:
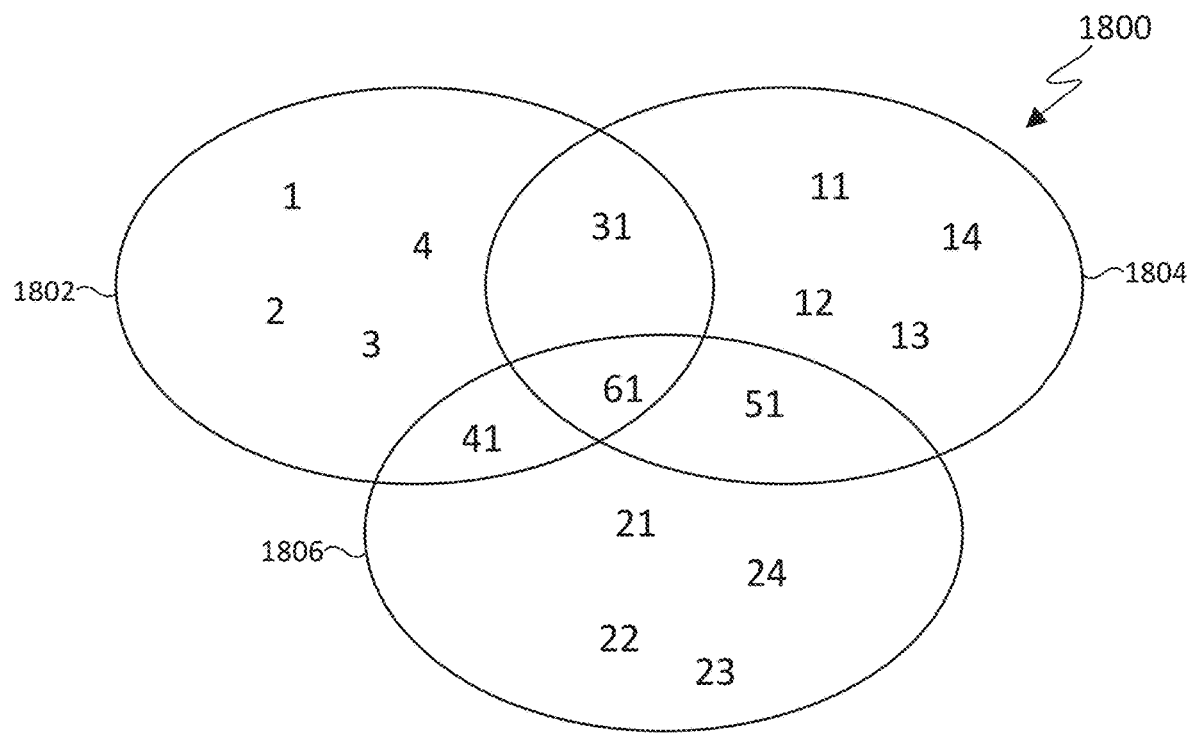
FIG. 18 illustrates a diagram illustrating exclusivity and non-exclusivity of codewords according to various embodiments of this disclosure.

FIG. 18 illustrates a diagram illustrating exclusivity and non-exclusivity of codewords according to various embodiments of this disclosure. The codebooks can be stored in an electronic device, such as BS 102 in FIG. 2, UE 116 in FIG. 3, or server 400 in FIG. 4.

In diagram 1800, numbers represent beams and the collection of numbers encircled together represent a codebook. Thus, beams for frequency part f1 are shown in codebook 1802, beams for frequency part f2 are shown in codebook 1804, and beams for frequency part f3 are shown in codebook 1806. In particular, codebook 1802 includes beams 1, 2, 4, 31, 41, and 61. Codebook 1804 includes beams 11, 12, 13, 14, 31, 51, and 61. Codebook 1806 includes beams 21, 22, 23, 24, 41, 51, and 61. Beams in overlapping circles represent shared, e.g., non-exclusive beams and beams in only one circle represent exclusive beams. Thus, beams 1, 2, 3, and 4 are exclusive to codebook 1802. Table 1 below shows the frequency part combination and the beams that form the resultant codebook.

TABLE 1

| Frequency Part Combination | Codebook Beams |
| --- | --- |
| {f1} | 1, 2, 3, 4, 31, 41, 61 |
| {f2} | 11, 12, 13, 14, 31, 51, and 61 |
| {f3} | 21, 22, 23, 24, 41, 51, and 61 |
| {f1, f2} | 1, 2, 3, 4, 11, 12, 13, 14, 31, 41, 51, 61 |
| {f1, f3} | 1, 2, 3, 4, 21, 22, 23, 24, 31, 41, 51, 61 |
| {f2, f3} | 11, 12, 13, 14, 21, 22, 23, 24, 31, 41, 51, 61 |
| {f1, f2, f3} | 1, 2, 3, 4, 11, 12, 13, 14, 21, 22, 23, 24, 31, 41, 51, 61 |

Figure 19:
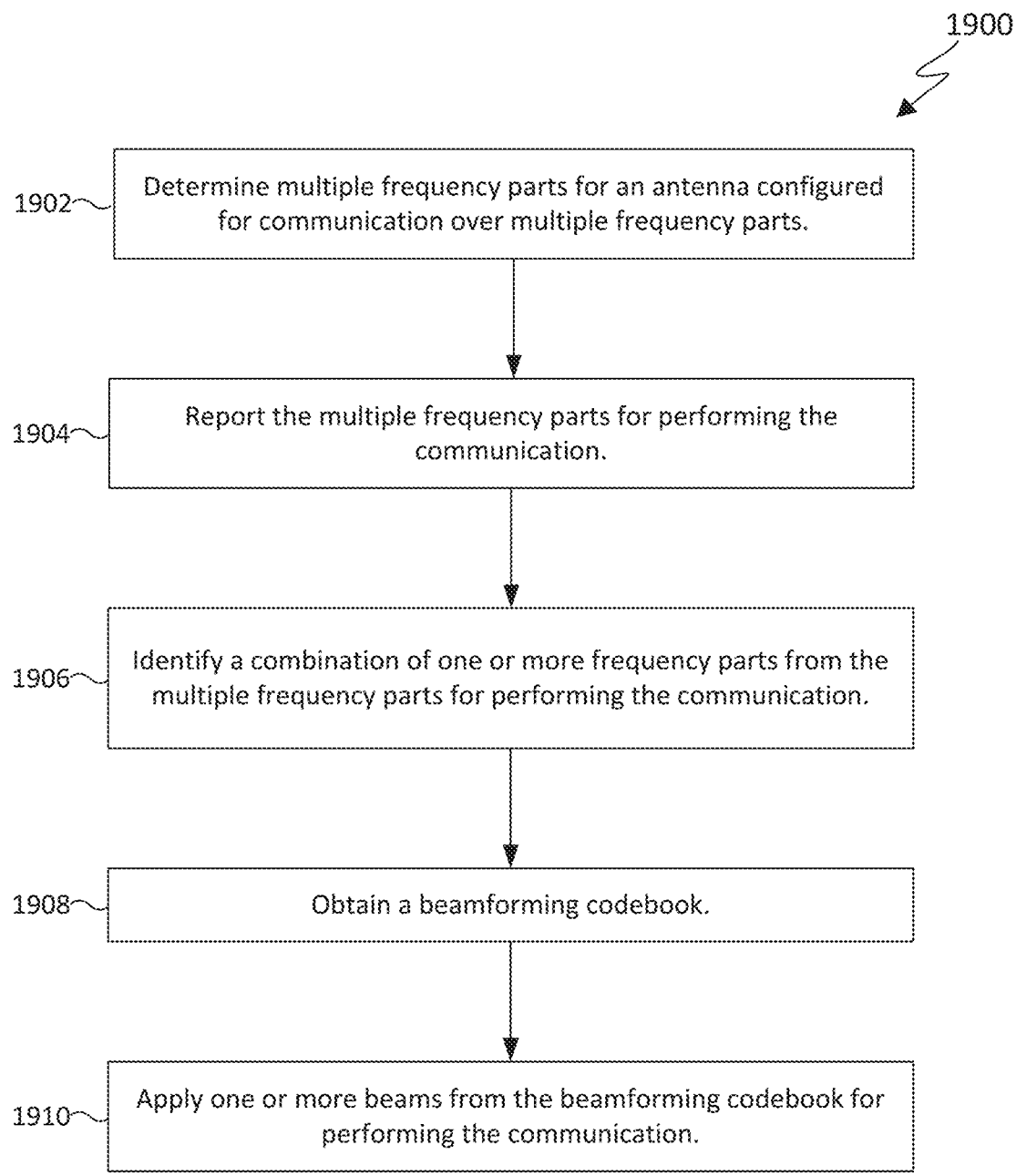
FIG. 19 illustrates a flowchart for managing an antenna operating in a combination of frequency parts according to various embodiments of this disclosure.

FIG. 19 illustrates a flowchart for managing an antenna operating in a combination of frequency parts according to various embodiments of this disclosure. Operations of flowchart 1900 can be implemented in an electronic device such as BS 102 in FIG. 2 and UE 116 in FIG. 3.

Flowchart 1900 begins at operation 1902 by determining multiple frequency parts for an antenna configured for communication over multiple frequency parts. The frequency part can be a frequency band, a carrier within the frequency band, or a bandwidth part (BWP) in the carrier. In one embodiment, the multiple frequency parts are identified based on at least one of: spacing between the plurality of antenna elements, wavelengths of the multiple frequency parts, a radiation gain of the transceiver, or radiation efficiency of the multiple frequency parts.

In operation 1904, the multiple frequency parts for performing the communication are reported. In one embodiment the multiple frequency parts are reported to the network in a physical uplink control channel (PUCCH).

In operation 1906, a combination of one or more frequency parts are identified from the multiple frequency parts for performing the communication. In one embodiment, the combination is identified from a configuration received from the network in response to the multiple frequency parts reported in the PUCCH. In another embodiment, the combination of the one or more frequency parts is identified for a physical downlink control channel (PDCCH) or the PUCCH.

In operation 1908, a beamforming codebook is obtained. In one embodiment, the beamforming codebook is obtained by selecting the beamforming codebook from a plurality of beamforming codebooks stored in memory, the selected beamforming codebook based on the combination of the one or more frequency parts and a bandwidth management operation. Non-limiting examples of the bandwidth management operation can include carrier aggregation, dual connectivity, or bandwidth adaptation. Each of the plurality of beamforming codebooks can correspond to a different combination of frequency parts from the multiple frequency parts and each of the plurality of beamforming codebooks can be based on electromagnetic response data of the electronic device and attributes of the frequency parts, the attributes including bandwidth, pathloss, and beamforming gain.

In another embodiment, the beamforming codebook is obtained in operation 1908 by generating the beamforming codebook based on the combination of the one or more frequency parts and the bandwidth management operation. Additionally, the beamforming codebook can be obtained based on attributes of the frequency parts that form the multiple frequency parts. Examples of the attributes can include bandwidth, pathloss, and beamforming gain.

In operation 1910, one or more beams within the beamforming codebook is applied for performing the communication.

In an embodiment in which the combination of frequency parts includes uplink frequency parts of an uplink channel and downlink frequency parts of a downlink channel, obtaining the beamforming codebook comprises obtaining a first codebook for the uplink frequency parts and obtaining a second codebook for the downlink frequency parts. The beamforming codebook is selected from the first codebook and the second codebook based on a comparison of at least one metric for the uplink channel and the downlink channel, the at least one metric including: priority, latency, throughput, reference signal receive power (RSRP), signal-to-noise ratio (SNR), and signal-to-interference-plus-noise ratio (SINR).

In some embodiments, the codebook is obtained in operation 1908 to maximize a weighted sum of a performance metric across the combination of the one or more frequency parts, or to maximize a minimal weighted performance metric across the combination of the one or more frequency parts.

In some embodiments, the beamforming codebook obtained in operation 1908 is one of the plurality of beamforming codebooks stored in the memory of the electronic device, the beamforming codebook including codewords that are shared with one or more other beamforming codebooks in the plurality of beamforming codebooks. Additionally, the beamforming codebooks can include beam codewords for each frequency part in the combination of the one or more frequency parts.

Although this disclosure has been described with an exemplary embodiment, various changes and modifications may be suggested to one skilled in the art. It is intended that this disclosure encompass such changes and modifications as fall within the scope of the appended claims.

What is claimed is:

1. An electronic device comprising:
    at least one antenna including a plurality of antenna elements;
    a transceiver operably connected with the at least one antenna, the transceiver configured for communication over multiple frequency parts; and
    a processor operably connected to the transceiver, the processor configured to:

determine the multiple frequency parts based on at least one of: spacing between the plurality of antenna elements, wavelengths of the multiple frequency parts, a radiation gain of the transceiver, or radiation efficiency of the multiple frequency parts;

report, in a physical uplink control channel (PUCCH), the multiple frequency parts for performing the communication;

identify, from a configuration received in response to the multiple frequency parts reported in the PUCCH, a combination of one or more frequency parts from the multiple frequency parts for performing the communication;

obtain a beamforming codebook by (i) selecting the beamforming codebook from a plurality of beamforming codebooks stored in memory, the selected beamforming codebook based on the combination of the one or more frequency parts and a bandwidth management operation, or (ii) generating the beamforming codebook based on the combination of the one or more frequency parts and the bandwidth management operation; and apply one or more beams within the beamforming codebook for performing the communication.

2. The electronic device of claim 1, wherein a frequency part is one of a frequency band, a carrier within the frequency band, or a bandwidth part (BWP) in the carrier.

3. The electronic device of claim 1, wherein the bandwidth management operation comprises carrier aggregation, dual connectivity, or bandwidth adaptation.

4. The electronic device of claim 1, wherein to identify the combination of the one or more frequency parts, the processor is further configured to identify the combination of the one or more frequency parts for a physical downlink control channel (PDCCH) or the physical uplink control channel (PUCCH).

5. The electronic device of claim 1, wherein the multiple frequency parts include uplink frequency parts of an uplink channel and downlink frequency parts of a downlink channel that differ from the uplink frequency parts, and to obtain the beamforming codebook, the processor is further configured to:

obtain a first codebook for the uplink frequency parts; and
obtain a second codebook for the downlink frequency parts,
wherein the beamforming codebook is selected from the first codebook and the second codebook based on a comparison of at least one metric for the uplink channel and the downlink channel, the at least one metric including: priority, latency, throughput, reference signal receive power (RSRP), signal-to-noise ratio (SNR), and signal-to-interference-plus-noise ratio (SINR).

6. The electronic device of claim 1, wherein:
frequency parts of the multiple frequency parts include attributes comprising bandwidth, pathloss, and beamforming gain, and
the beamforming codebook is obtained based on the attributes.

7. The electronic device of claim 1, wherein:
each of the plurality of beamforming codebooks corresponds to a different combination of frequency parts from the multiple frequency parts, each of the plurality of beamforming codebooks based on electromagnetic response data of the electronic device and attributes of the frequency parts, the attributes including bandwidth, pathloss, and beamforming gain.

8. The electronic device of claim 1, wherein the beamforming codebook is obtained to maximize a weighted sum of a performance metric across the combination of the one or more frequency parts, or to maximize a minimal weighted performance metric across the combination of the one or more frequency parts.

9. The electronic device of claim 1, wherein when the beamforming codebook is one of the plurality of beamforming codebooks stored in the memory of the electronic device, the beamforming codebook includes codewords that are shared with one or more other beamforming codebooks in the plurality of beamforming codebooks.

10. The electronic device of claim 1, wherein the beamforming codebook includes beam codewords for each frequency part in the combination of the one or more frequency parts.

11. A method for managing an antenna in an electronic device, the method comprising:
determining, for the antenna including a plurality of antenna elements configured for communication over multiple frequency parts, the multiple frequency parts based on at least one of: spacing between the plurality of antenna elements, wavelengths of the multiple frequency parts, a radiation gain of the antenna, or radiation efficiency of the multiple frequency parts;

reporting, in a physical uplink control channel (PUCCH), the multiple frequency parts for performing the communication;

identifying, from a configuration received in response to the multiple frequency parts reported in the PUCCH, a combination of one or more frequency parts from the multiple frequency parts for performing the communication;

obtaining a beamforming codebook by (i) selecting the beamforming codebook from a plurality of beamforming codebooks stored in memory, the selected beamforming codebook based on the combination of the one or more frequency parts and a bandwidth management operation, or (ii) generating the beamforming codebook based on the combination of the one or more frequency parts and the bandwidth management operation; and applying one or more beams within the beamforming codebook for performing the communication.

12. The method of claim 11, wherein a frequency part is one of a frequency band, a carrier within the frequency band, or a bandwidth part (BWP) in the carrier.

13. The method of claim 11, wherein the bandwidth management operation comprises carrier aggregation, dual connectivity, or bandwidth adaptation.

14. The method of claim 11, wherein identifying the combination of the one or more frequency parts comprises identifying the combination of the one or more frequency parts for a physical downlink control channel (PDCCH) or the physical uplink control channel (PUCCH).

15. The method of claim 11, wherein:
the multiple frequency parts include uplink frequency parts of an uplink channel and downlink frequency parts of a downlink channel that differ from the uplink frequency parts, obtaining the beamforming codebook comprises:
obtaining the beamforming codebook comprises:
obtaining a first codebook for the uplink frequency parts; and
obtaining a second codebook for the downlink frequency parts, and
the beamforming codebook is selected from the first codebook and the second codebook based on a comparison of at least one metric for the uplink channel and the downlink channel, the at least one metric including: priority, latency, throughput, reference signal receive power (RSRP), signal-to-noise ratio (SNR), and signal-to-interference-plus-noise ratio (SINK).

16. The method of claim 11, wherein:
frequency parts of the multiple frequency parts include attributes comprising bandwidth, pathloss, and beamforming gain, and
the beamforming codebook is obtained based on the attributes.

17. The method of claim 11, wherein each of the plurality of beamforming codebooks corresponds to a different combination of frequency parts from the multiple frequency parts, each of the plurality of beamforming codebooks based on electromagnetic response data of the electronic device and attributes of the frequency parts, the attributes including bandwidth, pathloss, and beamforming gain.

18. The method of claim 11, wherein the beamforming codebook is obtained to maximize a weighted sum of a performance metric across the combination of the one or more frequency parts, or to maximize a minimal weighted performance metric across the combination of the one or more frequency parts.

19. The method of claim 11, wherein when the beamforming codebook is one of the plurality of beamforming codebooks stored in the memory of the electronic device, the beamforming codebook includes codewords that are shared with one or more other beamforming codebooks in the plurality of beamforming codebooks.

20. The method of claim 11, wherein the beamforming codebook includes beam codewords for each frequency part in the combination of the one or more frequency parts.

* * * * *